United States Patent [19]

Hayashi

[11] Patent Number: 5,425,012

[45] Date of Patent: Jun. 13, 1995

[54] TRACK DETECTOR CIRCUIT FOR DETECTING A TRACK WHEN AT LEAST EITHER OPTICAL RECORDING OR REGENARATION IS PERFORMED ON A CARD-LIKE INFORMATION RECORDING MEDIUM

[75] Inventor: Yasuo Hayashi, Hachioji, Japan

[73] Assignee: Olympus Optical Co., Ltd., Tokyo, Japan

[21] Appl. No.: 68,028

[22] Filed: May 28, 1993

[30] Foreign Application Priority Data

Jun. 1, 1992 [JP] Japan .................. 4-140625
Sep. 14, 1992 [JP] Japan .................. 4-245250
Sep. 30, 1992 [JP] Japan .................. 4-261731

[51] Int. Cl.[6] ............................. G11B 7/13
[52] U.S. Cl. ................... 369/44.280; 369/44.410; 369/44.420; 369/44.350; 369/120
[58] Field of Search ............ 369/44.28, 44.29, 44.41, 369/44.42, 44.11, 44.34, 44.35, 44.36, 44.26, 54, 58, 120

[56] References Cited

U.S. PATENT DOCUMENTS

| 5,155,718 | 10/1992 | Hashimoto et al. | 369/44.42 |
| 5,157,249 | 10/1992 | Hashimoto | 369/44.41 |
| 5,168,487 | 12/1992 | Ohsato et al. | 369/44.41 |
| 5,191,571 | 3/1993 | Fukumoto et al. | 369/44.41 |

FOREIGN PATENT DOCUMENTS 2-54428  2/1990  Japan .
2-165433  6/1990  Japan .
2-203818  8/1990  Japan .

*Primary Examiner*—Georgia Y. Epps
*Assistant Examiner*—Muhammad N. Edun
*Attorney, Agent, or Firm*—Armstrong, Westerman, Hattori, McLeland & Naughton

[57] ABSTRACT

In a guide pattern detecting circuit installed in a tracking control circuit, a sum of outputs of guide pattern light receiving elements, $\Sigma En$, is converted from a current into a voltage by an I-V converter. The sums of outputs of odd-numbered light receiving elements for clock signal production and of even-numbered light receiving elements for clock signal production, $\Sigma B2n-1$ and $\Sigma B2n$, are converted from currents into voltages by I-V converters $31b$ and $31c$. The sums of outputs converted from currents into voltages, En, and $B2n-1$ and $B2n$ are supplied to two differential amplifiers. One of the amplifiers outputs $(\Sigma En - \Sigma B2n-1)$, and the other one thereof outputs $(\Sigma En - \Sigma B2n)$. The differential outputs $(\Sigma En - \Sigma B2n-1)$ and $(\Sigma En - \Sigma B2n)$ are supplied to two low filters, whereby dc components are cut off. These differential signals are supplied to two multipliers and then squared. The squared signals are then added up by an adder, thus providing a sum-of-squares output. The sum-of-squares signal becomes an input of a reversed terminal of a comparator. The comparator compares the input of the reversed terminal with a reference value $V_{TH}$ fed to the unreversed terminal, and then outputs a guide pattern detected signal Gdet.

20 Claims, 22 Drawing Sheets

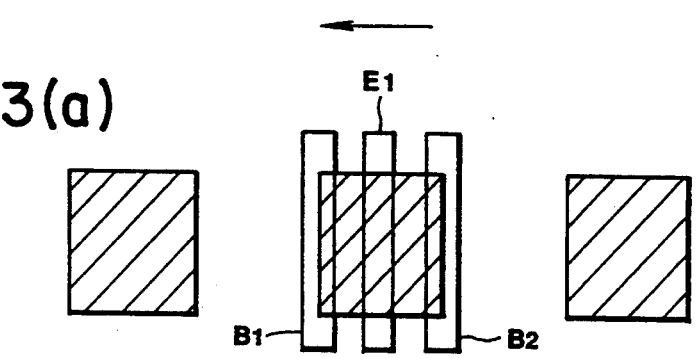
FIG. 3(a)
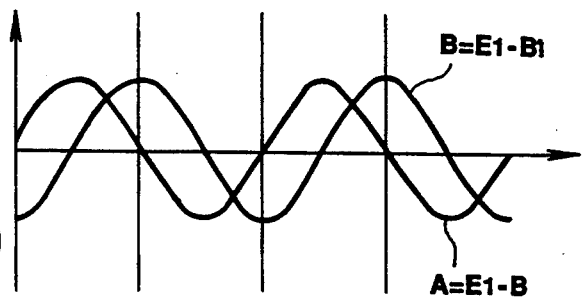
FIG. 3(b)
FIG.5
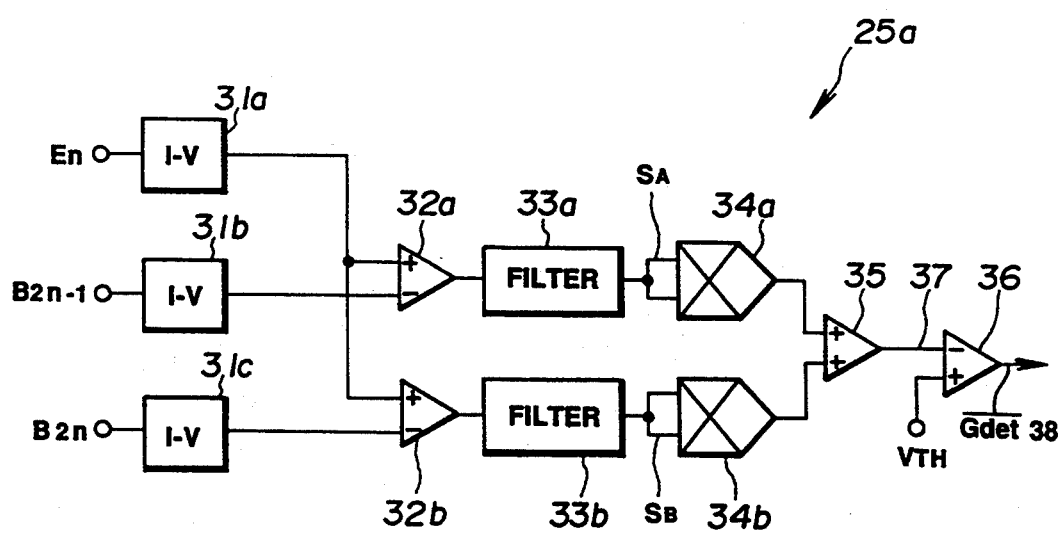

FIG.6(a)
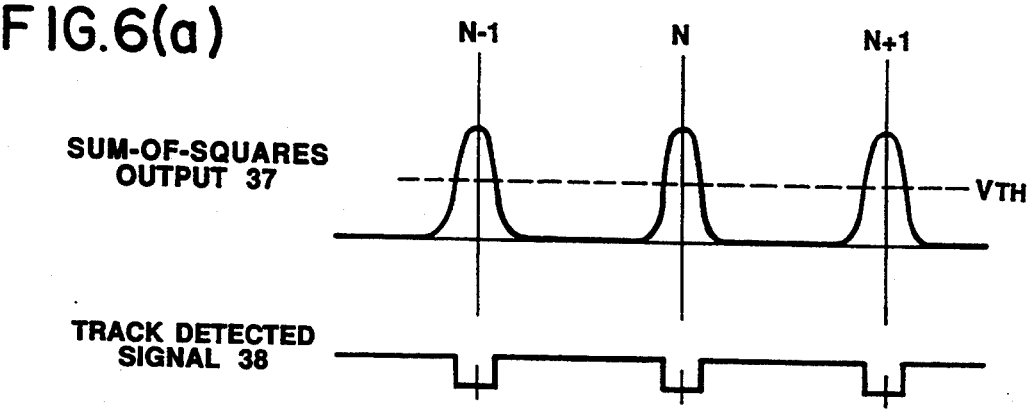
FIG.6(b)
FIG.13
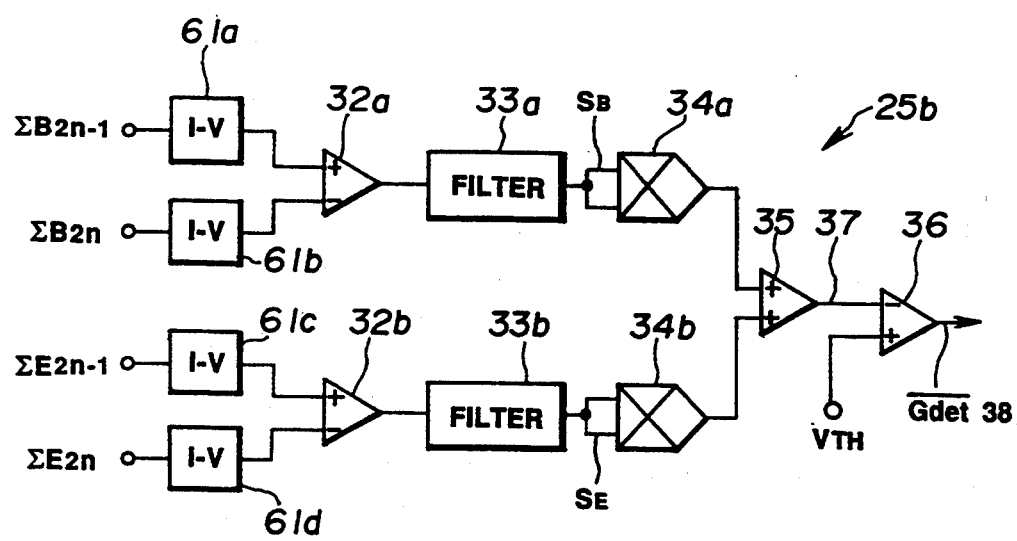

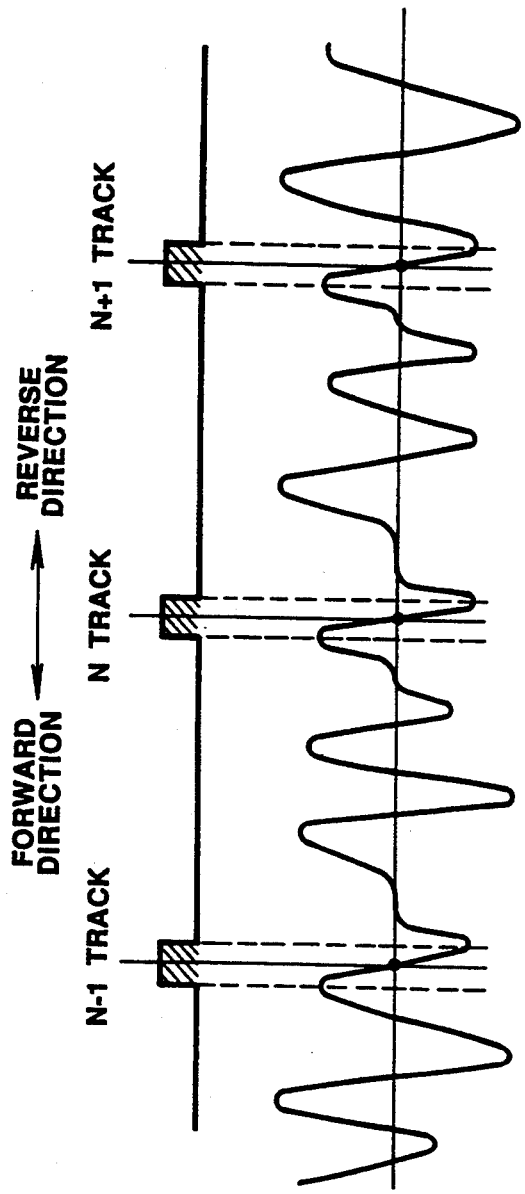

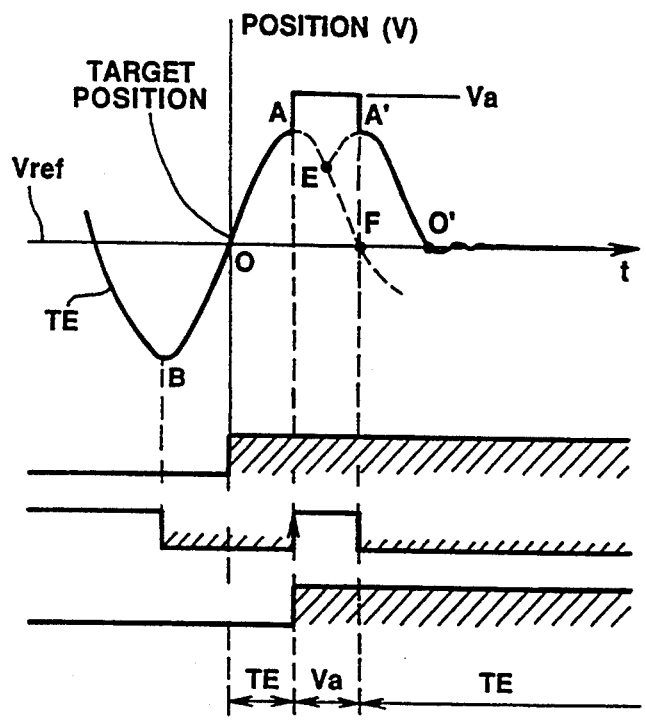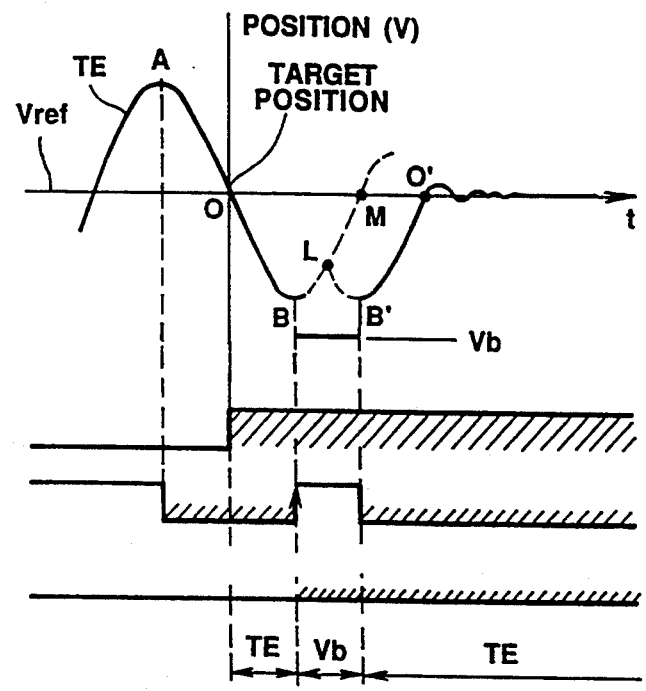

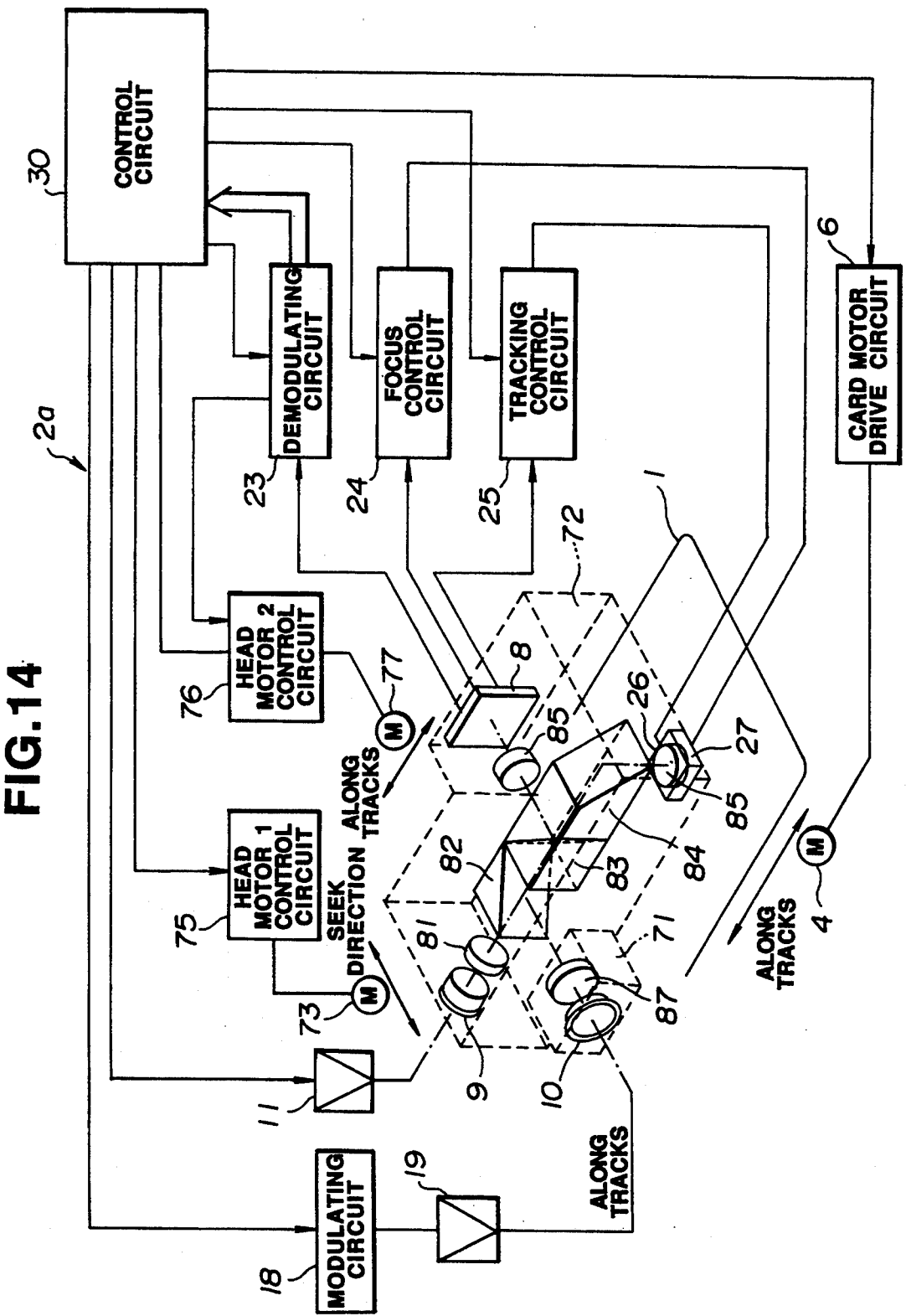

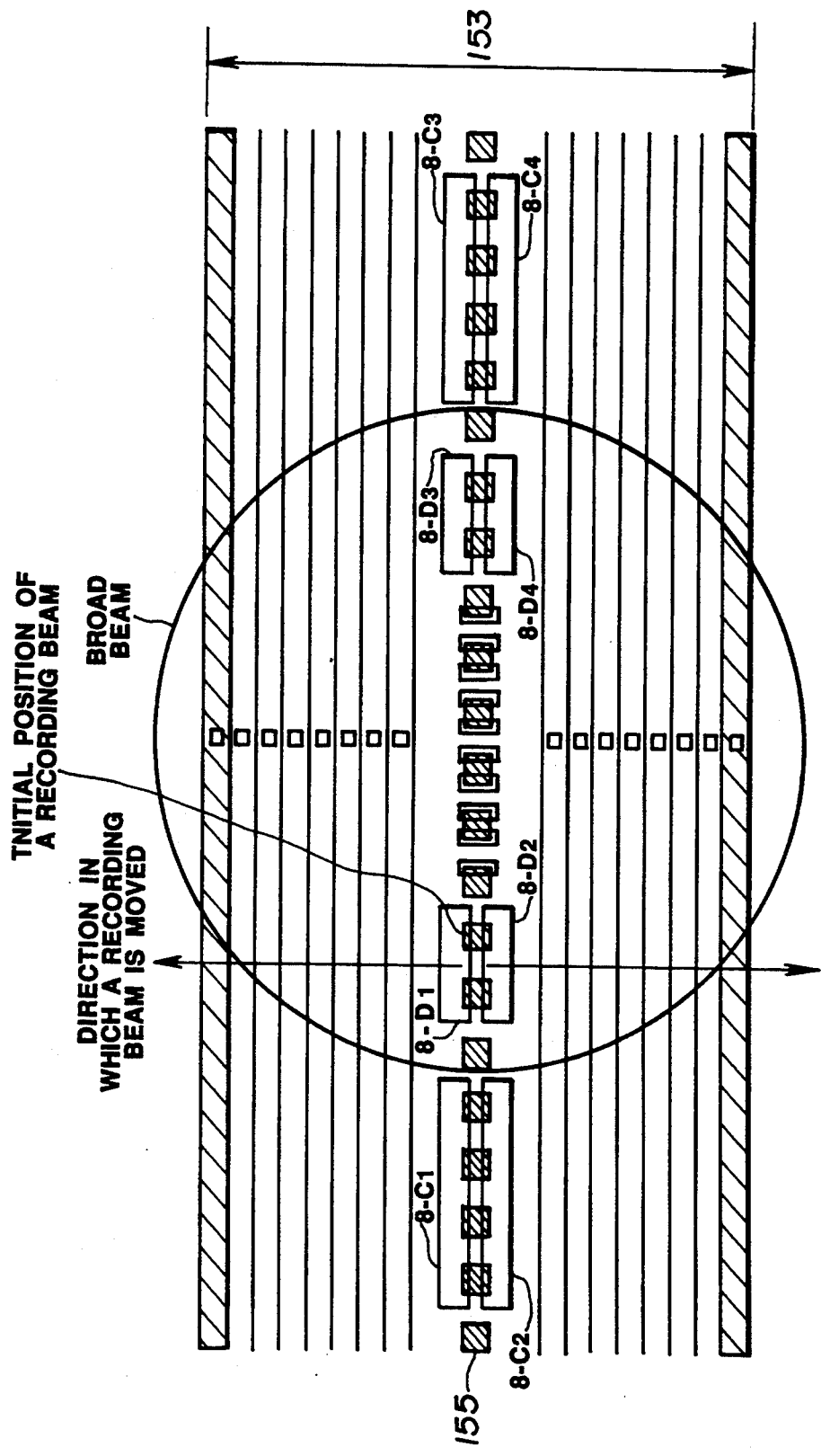

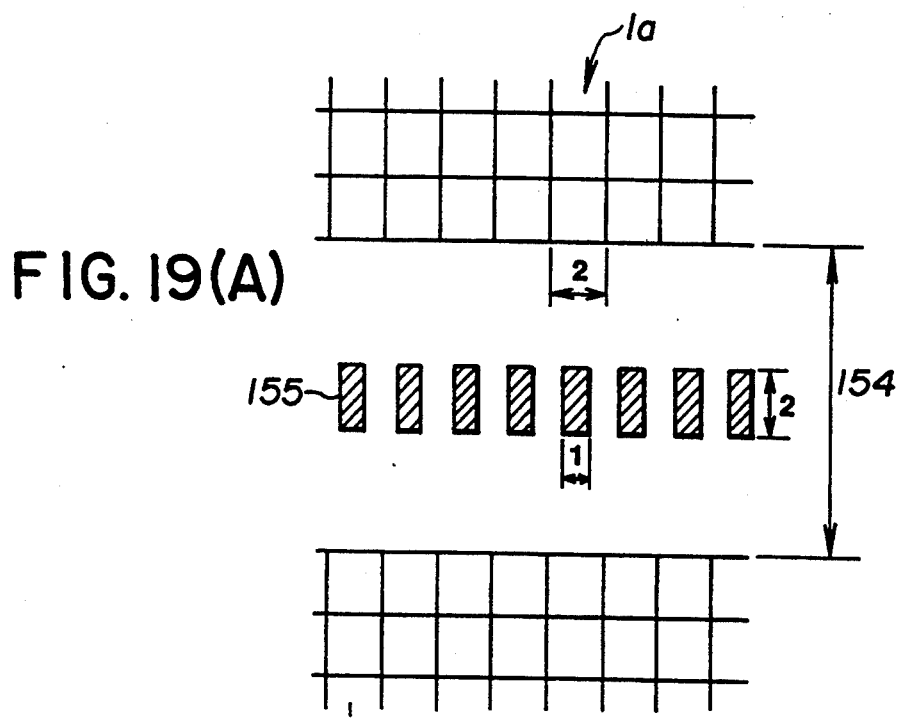
FIG. 19(A)
FIG. 19(B)
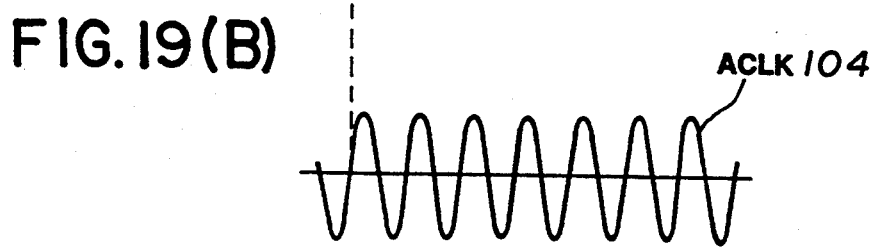
FIG. 20 (PRIOR ART)

FIG. 26(a)
(PRIOR ART)
TE SIGNAL
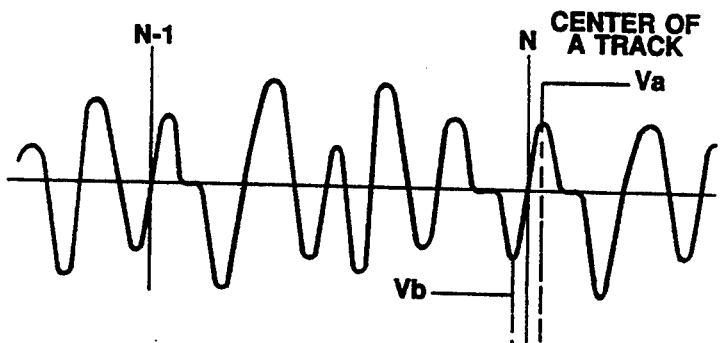
FIG. 26(b)
(PRIOR ART)
IDENTIFICATION PATTERN CONSISTENCY SIGNAL
TARGET TRACK PATTERN CONSISTENCY SIGNAL
FIG. 26(c) (PRIOR ART)
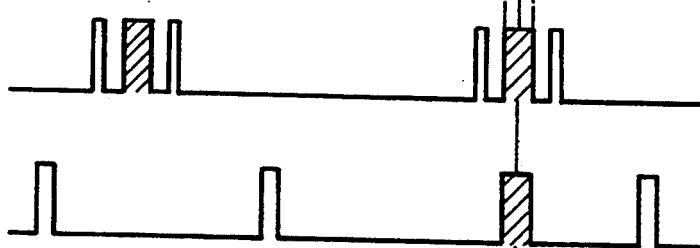
ON TRACK SIGNAL
FIG. 26(d)
(PRIOR ART)
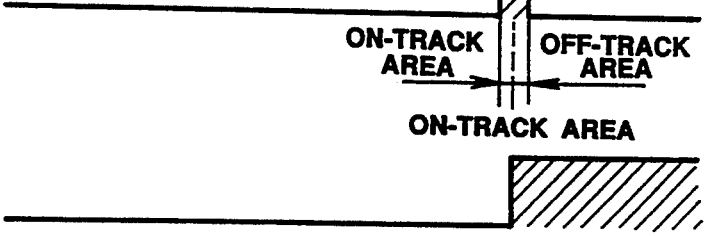
TON
FIG. 26(e)
(PRIOR ART)

TRACK DETECTOR CIRCUIT FOR DETECTING A TRACK WHEN AT LEAST EITHER OPTICAL RECORDING OR REGENARATION IS PERFORMED ON A CARD-LIKE INFORMATION RECORDING MEDIUM

BACKGROUND OF THE INVENTION

1. Field of the Invention

The present invention relates to a track detector circuit for detecting a track when at least either optical recording or regenerating of information is performed on an information recording/regenerating medium having a plurality of tracks each of which includes at least a first area formed by combining areas of different reflectances along tracks and a second area formed by combining areas of different reflectances perpendicularly to the tracks.

2. Description of the Related Art

An optical card has the same size and shape as a credit cart, which is portable but not rewritable similarly to an optical disk. The optical card is characterized by the large recording capacity (1 to 2.5 megabytes) and low costs per sheet of card. The optical card is therefore recognized as a promising information recording-/regenerating medium for the next generation, for which a wide range of applications are pondered over.

An optical card shown in FIG. 20 has been proposed as an example of a conventional optical information recording/regenerating medium in Japanese Patent Laid-Open No.63-145669. In the optical card 1, information is recorded as pits and regenerated optically as differences in reflectances. The information is recorded or regenerated in units of what is referred to as a track 153. Multiple linear band-like tracks 153 are lined up in parallel with one another, thus forming a sheet of card. ID areas 152a, 152b, and 152c are allocated to both ends and center of the tracks 153. Track number patterns, and specific identification patterns allocated to the respective tracks for identifying the track numbers are pre-recorded in the ID areas, thus simplifying search for a target track.

Additionally-recorded information and pre-recorded information are saved in data areas 151a and 151b shown in FIG. 20.

FIG. 21 shows the detail of a track 153 in an area A enclosed with a dotted line in FIG. 20. Guide patterns 155 that are black and white patterns formed at regular intervals in the longitudinal direction of the card (along tracks) are pre-recorded in a guide line area 154 serving as a first area located in the center of the track 153. Data of 8 by 8 bits totaling to 16 bits are recorded across the track (seek direction) with the guide line area 154 between them.

As for the ID area 152a, alphanumeric characters 156a to 156h denote patterns for representing a track number and alphanumeric characters 157a to 157h denote specific identification patterns allocated to every track. The track number patterns 156a to 156h and identification patterns 157a to 157h constitute a second area.

The track number patterns 156 and identification patterns 157 in the ID area 152a are detected during track search (coarse seek). The data consisting of 16 bits in the data area 151 are read concurrently during regenerating. Thus, fast reading is achieved.

FIG. 22 shows an overall construction of an optical head 3. A semiconductor laser (LD) 10 is driven only for recording, while a light emitting diode (LED) 9 is driven for recording and regenerating.

Light originating from the LED 9 is irradiated onto an optical card 1 after passing through a collimator lens 12, a dichroic mirror 13a, a half prism 14, and an objective lens 15, and then illuminates broadly the entire width of a track. Light reflected from the optical card 1 is received by a photodetector 8' after passing through the objective lens 15, half prism 14, and an image formation lens 16.

Modulated light from the semiconductor laser 10 passes through a collimator lens 21, the dichroic mirror 13a, the half prism 14, and the objective lens 15, and then becomes a microscopic recording beam which will be projected on the optical card 1 within the broadly-illuminated region. The light projected on the optical card 1 physically changes the recording surface of the optical card 1 so as to record information. Light reflected from the optical card 1 is received by the photodetector 8' after passing through the objective lens 15, half prism 14, and image formation lens 16.

A recording beam is aligned across tracks by rotating the dichroic mirror 13a using a rotating means which is not shown. The objective lens 15 is driven along the optical axis and across tracks with driving current induced in a focus coil 26 and a tracking coil 27 respectively. Specifically, a focus servo and a tracking servo are actuated so that a recording or regenerating light spot comes into focus on the optical card 1 and follows a track.

FIG. 23 shows a light receiving surface 8a of the photodetector 8'. An image of the track 153 shown in FIG. 21 is formed on the light receiving surface 8a', and then a detected signal is output. The photodetector 8' includes 16 light receiving elements for data reading 8-A1 to 8-A16 associated with data recording positions of 16 bits which are arranged across tracks, and five pairs of light receiving elements for clock production 8-B1' to 8-B10' which are arranged along tracks and separated from one another so as to receive the light of the images of the guide patterns 155. The photodetector 8' further includes four pairs of light receiving elements for servo signal detection 8-C1 to 8-C4 and 8-D1 to 8-D4 which are arranged across tracks being separated from one another and opposed mutually.

FIG. 24 shows a distribution of quantities of the light originating from the LED 3 and forming an image on the photodetector 8'. When a relative distance of the optical card i from the objective lens 15 varies, the distribution of quantities of light originating from the LED 9 and forming an image on the photodetector 8' changes as shown in FIG. 24. A focus error (FE) signal is produced on the basis of a difference between a sum of the outputs of the outer light receiving elements for servo signal detection 8-C1, 8-C2, 8-C3, and 8-C4 and a sum of the outputs of the inner light receiving elements 8-D1, 8-D2, 8-D3, and 8-D4. A tracking error (TE) signal is produced on the basis of a difference between a sum of the outputs of the light receiving elements for servo signal detection 8-D1 and 8-D3, and a sum of the outputs of the light receiving elements 8D2 and 8-D4.

A clock signal is produced on the basis of a difference between a sum of the outputs of the odd-numbered light receiving elements 8-B1' 8-B3', 8-B5', 8-B7', and 8-B9', and a sum of the outputs of the even-numbered light receiving elements 8-B2', 8-B4', 8-B6', 8-B8', and 8-B10'. An optical card recording/regenerating apparatus having the foregoing optical head 3 reads 16-bit data concurrently from the outputs of the light receiving elements for data reading 8-A1 to 8-A16 during regenerating. During recording, a recording beam originating from the semiconductor laser 10 is projected to record data.

FIG. 25 shows the wave of a TE signal generated when the optical head 3 is moved across tracks with a tracking servo system broken.

When a target track is searched for, the recording-/regenerating point of a light spot is aligned with the center of an image of a guide patterns 155 in the target track. For this alignment, for example, Japanese Patent Laid-Open No. 2-203818 has proposed a tracking servo leading method to be mentioned below.

In the proposal, as shown in FIG. 26, an on-track (or off-track) signal is produced depending on whether or not a 16-bit regenerative signal based on the target track number patterns 156 and identification patterns 157 is consistent. After a tracking servo loop is closed (TON is high), a TE signal is selected in an on-track region (corresponding to a substantially linear portion of the TE signal), and a specified bipolarity voltage Va or Vb is selected in an off-track region (corresponding to a portion of the TE signal slightly deviated from an extreme value thereof). Thus, tracking servo leading is achieved.

However, when the recording/regenerating point of the optical head is aligned with the center of a specific track having the guide patterns 155 arranged at specified intervals along the track and multiple information lines located with the guide patterns 155 between them, the aforesaid 16-bit regenerative signal has been used to produce an on-track signal in the past.

Any of eight bits of the track number patterns 156 or the identification patterns 157 may be detected incorrectly due to dust, a flaw, a defect, of the like. Or when a regenerative signal is locked in synchronization with the zero-line crossing of the TE signal, a noise may be placed on the regenerative signal. Under these circumstances, an on-track signal is not output at a target position, a specified voltage Va or Vb is therefore not selected in an off-track region, and eventually a TE signal alone is used to achieve leading.

Consequently, the swing (inertia force) of an objective lens becomes stronger than the braking force of a servo system. Eventually, tracking servo leading fails. If a regenerative signal has not fully been binary-coded, an on-track signal is not output. This also results in a failure in tracking servo leading.

OBJECTS AND SUMMARY OF THE INVENTION

An object of the present invention is to provide a track detector circuit that when a light beam is accessed to an intended track on an information recording-/regenerating medium having multiple tracks each of which include at least a first area and a second area, can search for any track; that is, reliably detect the fact that the first area has been crossed.

Another object of the present invention is to provide a tracking servo leading circuit that when the recording/regenerating point of a light spot is aligned with a desired track on an information recording/regenerating medium having multiple tracks which include at least a first area and a second area, enables a tracking servo to achieve leading accurately and quickly, and resistively to the vibration of an objective lens resulting from disturbances, without the influence of the information patterns in the second area, and thus permits at least either stable recording or regenerating of information.

Another object of the present invention is to provide a compact and low-priced optical information recording/regenerating apparatus which is capable of aligning a recording beam with a specified position accurately for a short time and recording information as well as regenerating information efficiently.

Yet another object of the present invention is to provide an information recording medium capable of aligning a recording beam with a specified position accurately for a short time, and recording information.

A track detector circuit of the present invention, which is designed for an information recording-/regenerating medium having a plurality of tracks each of which include at least a first area formed by combining areas of different reflectances along tracks, and a second area formed by combining areas of different reflectances perpendicularly to the tracks, comprises:

a light beam moving means for moving a light beam to be irradiated over the first area and second area perpendicularly to the track;

a light receiving means that detects the images of the first area and second area formed with time light beam irradiated and that is divided into a plurality of sections along the track; and a cross detecting means that uses the detected outputs of the plurality of light receiving means to detect the fact that the light beam has crossed the first area.

A tracking servo leading circuit of the present invention including the tracking detector circuit comprises:

a signal generating means that generates a specified signal which has the same polarity as a tracking error signal produced using the detection outputs of the plurality of light receiving means; and a signal selecting means that selects the tracking error signal in a region in which the cross detecting means detects that the light beam has crossed the first area, and that selects the signal generated by the signal generating means outside the region in which the cross detecting means detects that the light beam has crossed the first area.

With the signal selected by the signal selecting means, the light beam is led to the desired track.

An optical information recording/regenerating apparatus of the present invention including the track detector circuit, comprising:

a light beam irradiating means for irradiating a light beam to the entire width of at least one of the plurality of tracks;

a light beam moving means for moving the light beam relatively along the track;

a light receiving means that receives the light of the images of the first area and second area formed with the light beam moved by the light beam moving means, and that is divided into a plurality of sections;

a signal producing means that uses the outputs of the light receiving means to produce a focus error signal, a tracking error signal, and a clock signal;

a control means that performs focus control and tracking control according to the focus error signal and tracking error signal;

an information recording means that irradiates a recording beam in synchronization with the clock signal and records information; and a track information regenerating means that uses the light beam to regenerate the information from the entire width of the track.

An information recording medium of the present invention designed for the optical information recording/regenerating apparatus, includes:

a plurality of lines of tracks; and guide patterns lined up along the track in the track, wherein:

the aspect ratio of each guide pattern is 1:2N (where, N denotes an integer).

The other features and advantages of the present invention will be apparent from the description below.

BRIEF DESCRIPTION OF THE DRAWINGS

FIGS. 1 to 9 relate to the first embodiment;

FIG. 1 shows a configuration of an optical card recording/regenerating apparatus;

FIG. 2 shows a layout of light receiving elements on a light receiving surface of a photodetector;

FIG. 3 shows waves for explaining a signal representing a difference between the light receiving elements in FIG. 2;

FIG. 4 is an explanatory diagram for signal wave production triggered by the movement across tracks of a light spot;

FIG. 5 is a block diagram showing a circuitry of a track detector circuit;

FIG. 6 shows waves for explaining the operation of the track detector circuit in FIG. 5;

FIG. 7 shows waves for explaining track search;

FIG. 8 is a block diagram showing a circuitry of a tracking control circuit;

FIG. 9 is an explanatory diagram for explaining tracking servo leading by the tracking control circuit in FIG. 8;

FIGS. 10 to 13 relate to the second embodiment;

FIG. 10 shows a layout of light receiving elements on a light receiving surface of a photodetector;

FIGS. 11(a) and 11(h) show waves for explaining a signal representing a difference between the light receiving elements in FIG. 10;

FIG. 12 is an explanatory diagram for signal wave production triggered by the movement across tracks of a light spot;

FIG. 13 is a block diagram showing a circuitry of a track detector circuit;

FIGS. 14 to 19 relate to the third embodiment;

FIG. 14 is a block diagram schematically showing a configuration of an entire optical card apparatus;

FIG. 15 shows a circuitry of a control circuit for a head motor 2;

FIG. 16 is a timing chart showing timing of signals;

FIG. 17 is a conceptual diagram for explaining alignment of a recording beam;

FIG. 18 is an explanatory diagram for explaining initial alignment of a recording beam;

FIG. 19 shows a structure of a track on an optical card in a variant;

FIGS. 20 to 26 relate to a prior art;

FIG. 20 is an outside diagram showing an appearance of an optical card;

FIG. 21 is an enlarged view showing the detail of a track format of an optical card in FIG. 20;

FIG. 22 shows the components of an optical head;

FIG. 23 shows an arrangement of a light receiving surface of a photodetector;

FIG. 24 is a distribution of illuminances on the light receiving surface of the photodetector;

FIG. 25 shows a wave of a tracking error signal during track search; and

FIG. 26 is an explanatory diagram for explaining the operations of tracking servo leading.

DETAILED DESCRIPTION OF THE PREFERRED EMBODIMENTS

Figure 1:
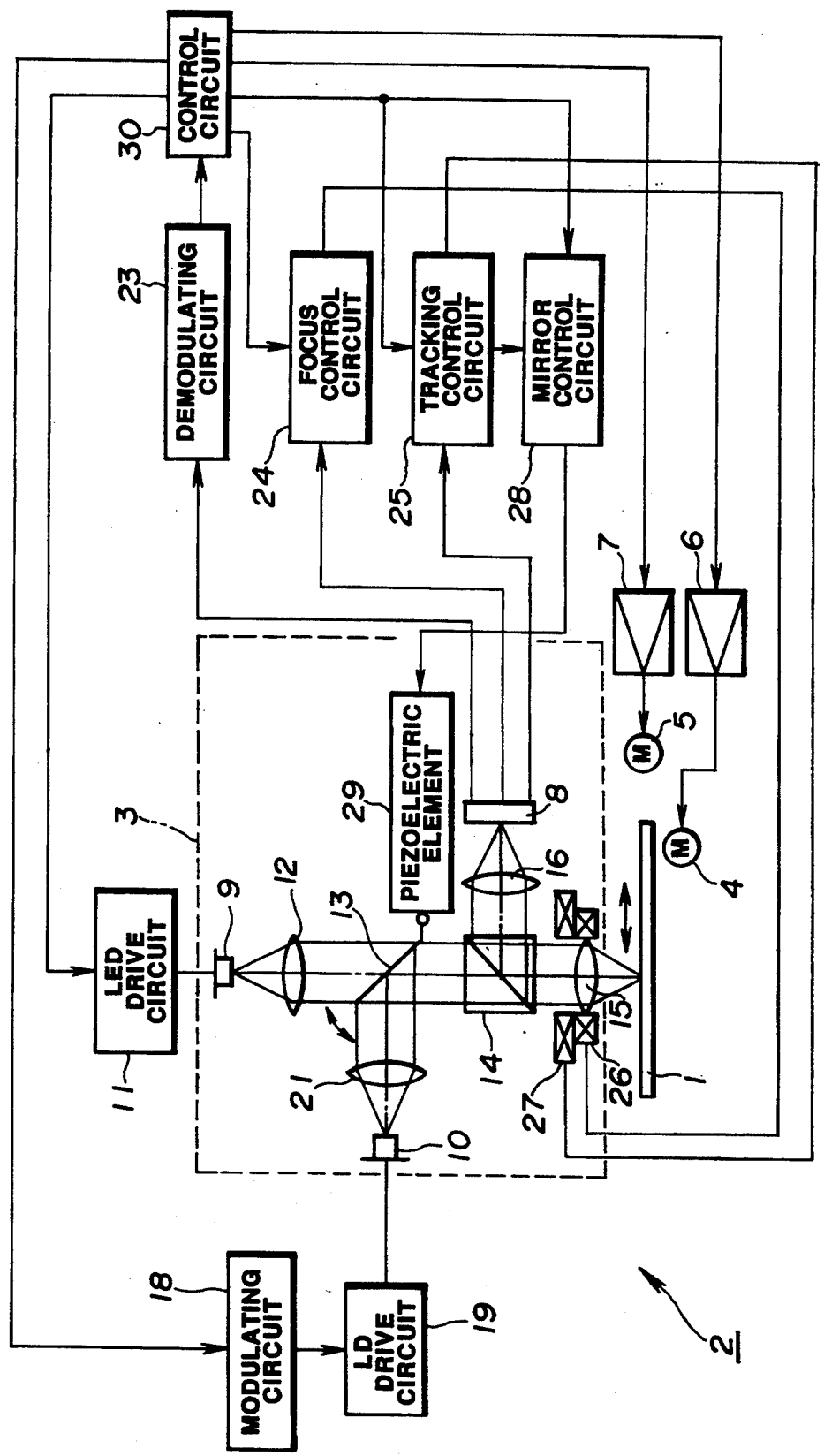

As shown in FIG. 1, in an optical card recording/regenerating apparatus 2 (hereinafter, abbreviated as an optical card apparatus) in the first embodiment, which records or regenerates information on or from an optical card 1, an optical head 3 is located on the opposite side of the optical card 1. The optical card 1 is moved along tracks thereon by a card motor 4. The optical head 3 is carried across the tracks or in a direction S (also referred to as a seek direction) by a head motor 5. The card motor 4 and head motor 5 are driven by drive circuits 6 and 7.

The optical head 3 accommodates a laser diode 10 for generating a light beam only during recording and thus recording information on the optical card 1, and a light emitting diode (hereinafter, abbreviated as an LED) 9 for emitting light during recording and regenerating. The LED 9 is driven by an LED drive circuit 11. The light of the LED 9 is recomposed by a collimator lens 12 and becomes a parallel beam. After transmitted by a mirror 13 and a half prism 14, the light is converged by an objective lens 15 and projected onto the optical card 1, thus spotlighting an information track so broadly as to cover the width of the track. The light reflected from the optical card 1, which has been broadly spotlighted, is converged by the objective lens 15 and reflected by the half prism 14. The reflected light is then received by a photodetector 8 via an image formation lens 16.

On the other hand, the laser diode 10 is driven by an laser diode drive circuit 19 according to recording data modulated by a modulating circuit 18, and then emits light. The light of the laser diode 10 is recomposed by a collimator lens 21 and becomes a parallel beam. After reflected by the mirror 13, the light is transmitted by the half prism 14 and then projected as a microscopic recording beam onto the optical card 1 within a region, which is broadly illuminated by the LED 9, by the objective lens 15.

With the projection, the recording surface of the optical card 1 is changed physically to record information. The reflected light is received by the photodetector 8 via the objective lens 15, half prism 14, and image formation lens 16.

The surface of the mirror 13 is provided with specified coating so as to efficiently transmit the light (for example, having a wavelength of 860 nm) originating from the LED 9 and efficiently reflect the light (for example, having a wavelength of 780 nm) originating from the laser diode 10.

A detected signal converted into an electric signal by the photodetector 8 is fed to a demodulating circuit 23 which then provides a read signal serving as a regenerative signal and a clock signal serving as a timing reference for recording or regenerating. Part of the detected signal is applied to the focus control circuit 24 and tracking control circuit 25 which then provide a focus error signal and a tracking error signal respectively. The focus error signal and tracking error signal are applied to a focus coil 26 and a tracking coil 27 in the optical head 3 via drive circuits which are not shown. The objective lens 15 is then driven toward parting from or approaching to the optical card 1, and in the seek direction S. Thus, auto-focus control and auto-tracking control are accomplished.

In order to align a recording beam originating from the laser diode 10 with a desired recording line, a mirror control circuit 28 produces a position signal associated with a tracking error signal. With the position signal, a piezoelectric element 29 is driven to rotate the mirror 13. Thus, accurate alignment is achieved.

The drive circuits 6 and 7, LED drive circuit 11, modulating circuit 18, focus control circuit 24, tracking control circuit 25, and mirror control circuit 28 are controlled by a control circuit 30. The control circuit 30 inputs an output signal of the demodulating circuit 23, and regenerates information recorded on the optical card 1.

Figure 21:
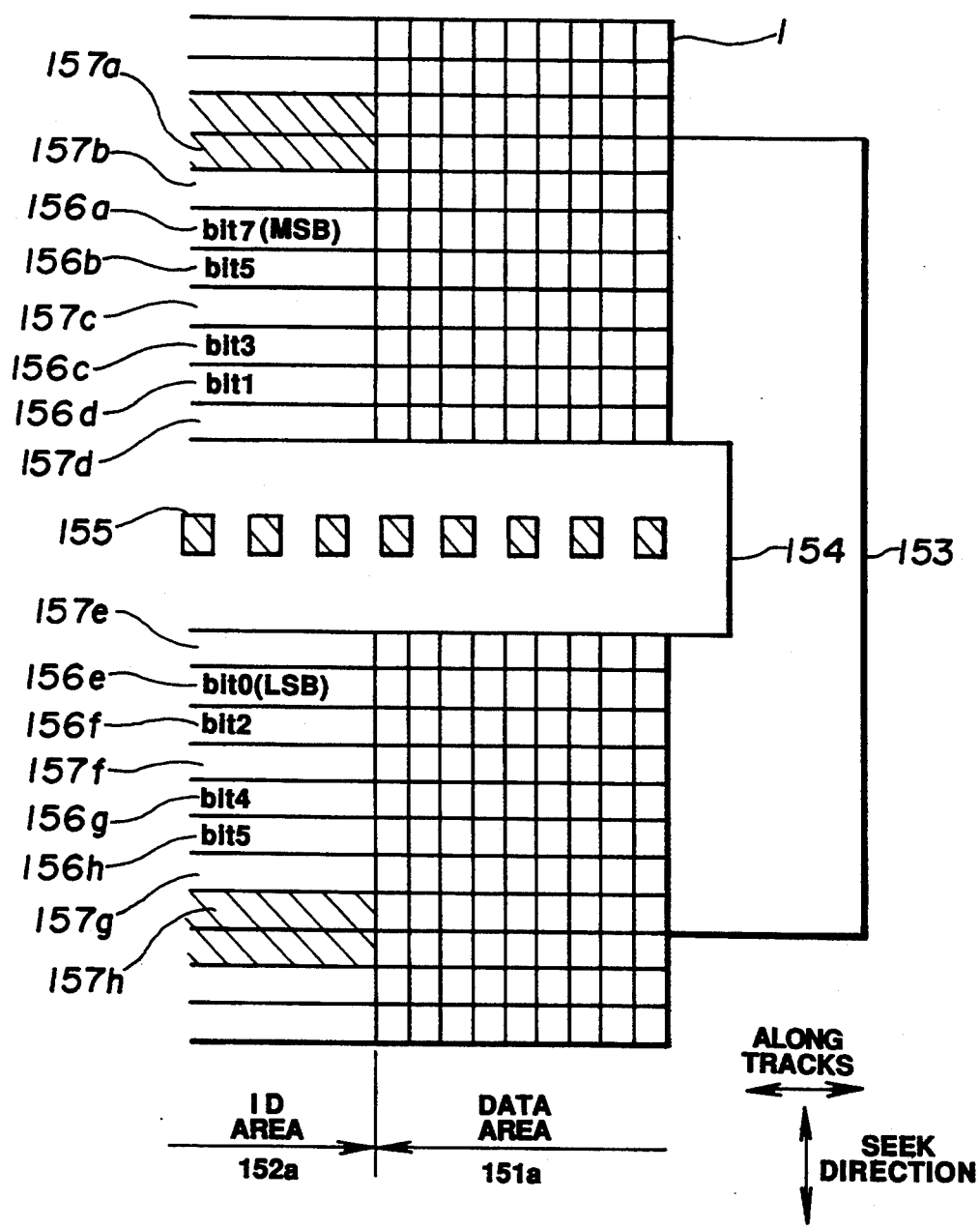
Figure 22:
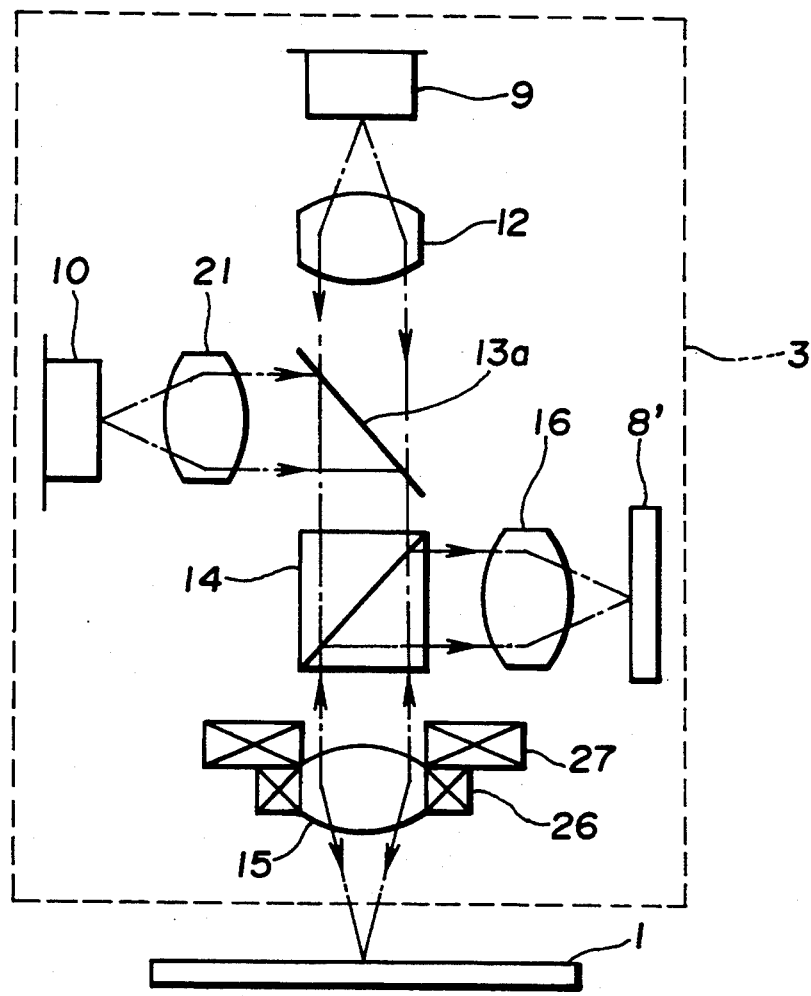

The optical card 1 is identical to the conventional one shown in FIGS. 20 and 21. The photodetector 8 is substantially identical to the conventional photodetector 8' shown in FIG. 23. The light receiving surface of the photodetector 8 is also the same as the light receiving surface 8a' of the photodetector 8' in FIG. 23 except the arrangement of light receiving elements for clock production. Only different arrangement will be described. The same components will bear the same numerals, of which description will be omitted.

Figure 2:
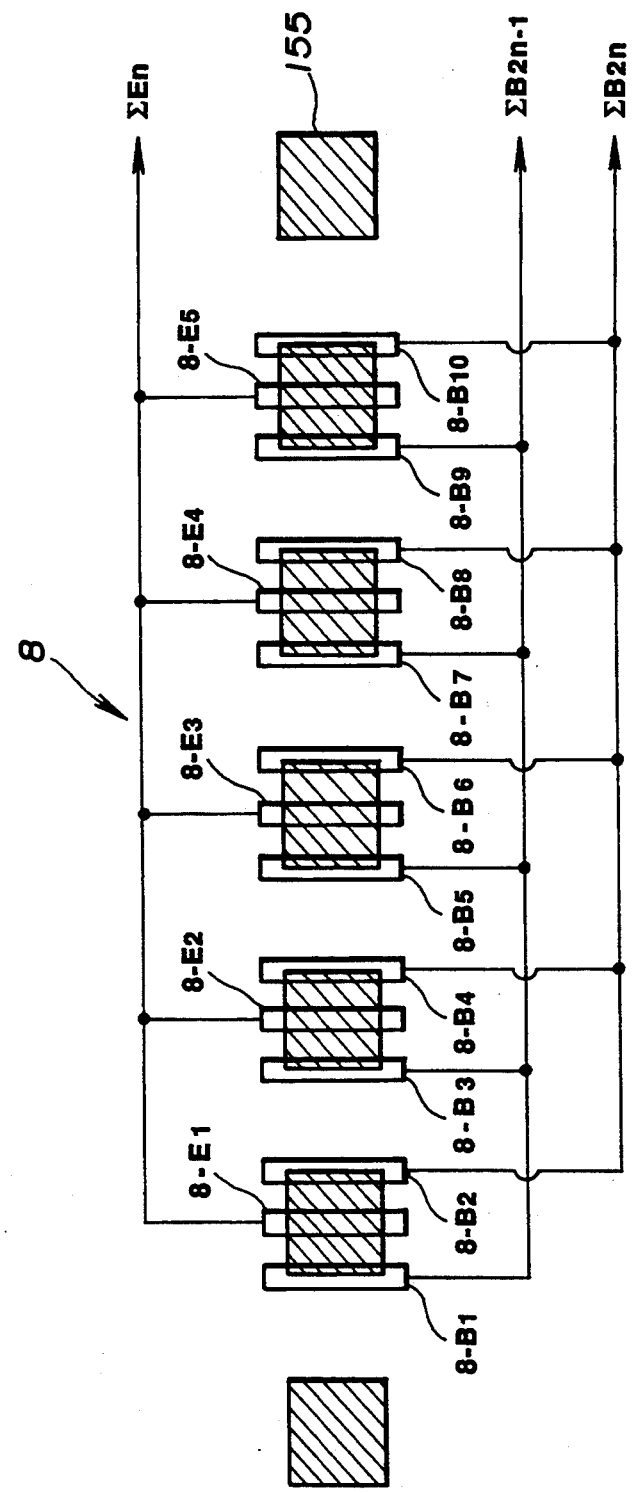

As shown in FIG. 2, the light receiving surface 8a of the photodetector 8 has light receiving elements for clock signal production 8-B1 to 8-B10 that produce a clock signal serving as a synchronizing signal for data reading and writing performed after the light of the images of the guide patterns 155 on the optical card 1 is received. The light receiving elements 8-B1 to 8-B10 for clock signal production are separated from one another so as to detect the edges of guide patterns 155.

Among the light receiving elements for clock signal production 8-B1 to 8-B10, the odd-numbered elements 8-B1, B3, B5, B7, and B9 are coupled with the even-numbered elements 8-B2, B4, B6, B8, and B10 respectively. Sums of outputs of the odd- and even-numbered elements are expressed as B2n−1 and B2n (where, n ranges from 1 to 5) respectively.

In addition to the foregoing components, five guide pattern light receiving elements 8-E1 to 8-E5 are arranged so as to lie in the middles of pairs of the light receiving elements for clock signal production. To be more specific, as shown in FIG. 2, a light receiving element 8-E1 is placed between the light receiving elements 8-B1 and B2, a light receiving element 8-E2 is placed between the light receiving elements 8-B3 and B4, and so on.

The guide pattern light receiving elements 8-E1 to 8-E5 are coupled with one another. A sum of the outputs of these elements is provided as En (where, n ranges from 1 to 5).

FIG. 3 shows the relationship between the output of a light receiving element and the quantity of movement of the optical head 3, wherein the recording/regenerating point of the optical head 3 is moved along tracks over the guide patterns 155. FIG. 3a shows the layout of a pair of light receiving elements for clock production B1 and B2, the guide pattern light receiving element E1, and the guide patterns 155 for simple description. FIG. 3b shows the waves of an output difference (E1−B1) and an output difference (E1−B2).

When the recording/regenerating point of the optical head 3 is moved over the guide patterns 155 along tracks, an output difference A between a guide pattern light receiving element and an odd-numbered light receiving element for clock production (E1−B1 in FIG. 3) is represented as Ksin t (where, K is a constant). A output difference B between a guide pattern light receiving element and an even-numbered light receiving element for clock production (E1−B2 in FIG. 3) is represented as a wave having a phase difference of 90° from the output difference A. That is to say, the output differences A and B are provided as follows:

$$A = \Sigma En - \Sigma B2n - 1 = K\sin\omega t \quad (K=\text{constant}) \quad (1)$$

$$B = \Sigma En - \Sigma B2n = K\sin(\omega t + p/2) = K\cos\omega t \quad (2)$$

A sum of squared A and B is:

$$A^2 + B^2 = K^2 \quad (3)$$

Thus, a sum of squared signals A and B is constant.

For simple description, the output differences A and B are regarded as perfect sine waves. In reality, however, the output differences A and B are not represented as perfect sine waves, but as periodic functions whose characteristics are substantially similar to that of a sine wave. The output differences A and B will therefore not be zero. A sum of squares thereof is larger than a certain constant and provided as, for example, $A^2 + B^2 > K^2$.

Assuming that the ID area 152 excluding the guide patterns 155 is moved across tracks (perpendicularly to tracks), the quantities of light received by guide pattern light receiving elements and light receiving elements for clock production are equal to each other:

$$\Sigma En = \Sigma B2n - 2 = \Sigma B2n \quad (4)$$

A sum of squared signals A and B is therefore substantially zero.

When the optical head 3 is moved across tracks in the ID area 152, if only the recording/regenerating point of the optical head 3 crosses the center of a guide pattern 155 irrelevant of the position along tracks, a substantially constant homopolarity output is provided. The output provided can be used as a guide pattern detected signal indicating that the crossing of the center of a guide pattern 155 is detected.

Figure 4:
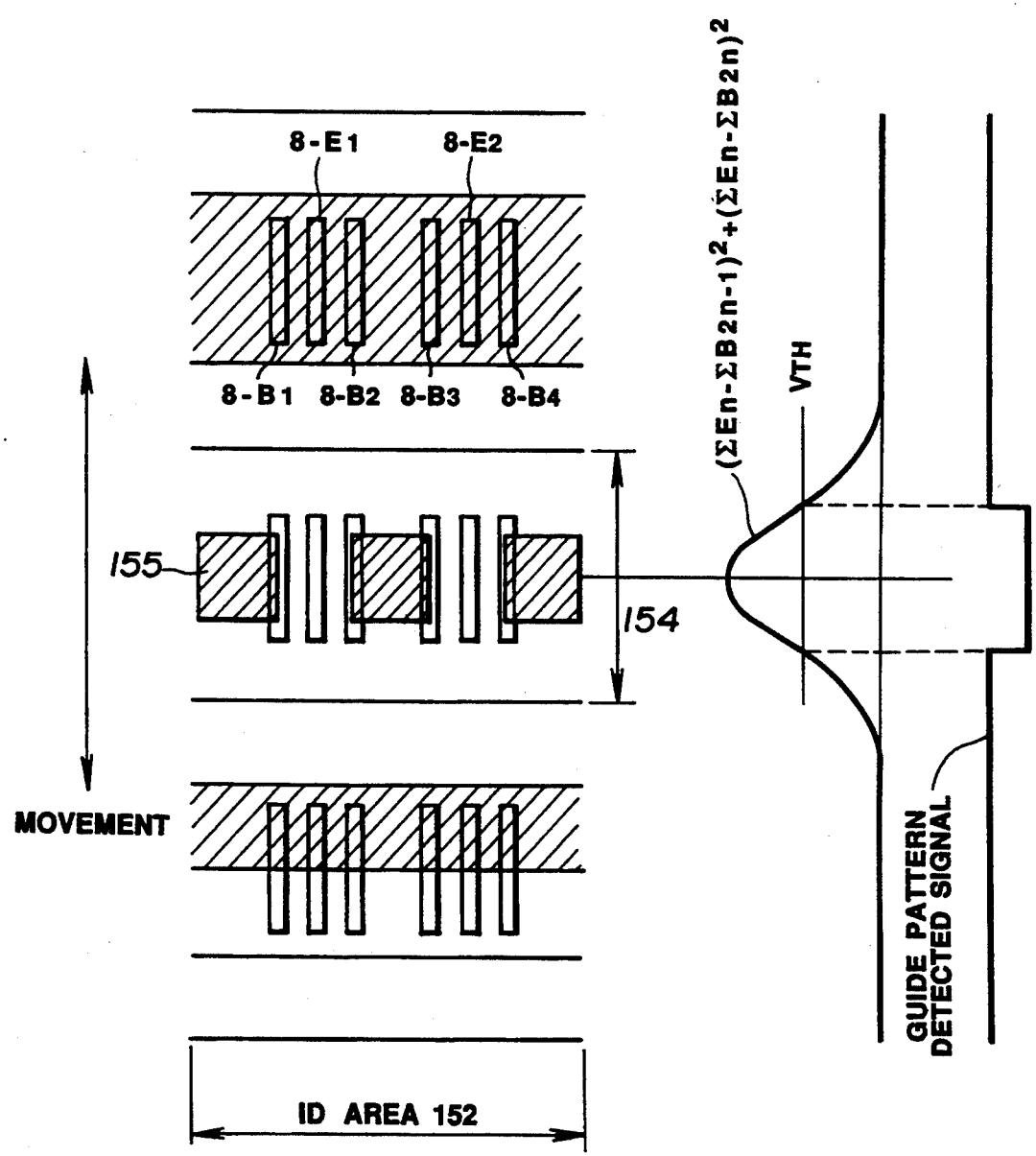

FIG. 4 shows the relationships between the locations of light receiving elements, and a sum-of-squares signal and the guide pattern detected signal, wherein the optical head 3 is moved across tracks in the ID area 152 to search for a track. The sum-of-squares signal is defined as:

$$(\Sigma En - \Sigma B2n - 1)^2 + (\Sigma En - \Sigma B2n)^2 \quad (5)$$

While the recording/regenerating point of the optical head 3 is running in any place except the guide patterns 155, the quantities of light entering light receiving elements are equal to one another. A sum-of-squares output is therefore substantially zero. On the contrary, when the recording/regenerating point of the optical head 3 crosses a guide pattern 155, the sum-of-squares output increases. When the recording/regenerating point comes to the center of the guide pattern 155, the sum-of-squares output has a maximum amplitude. The expression (5) provides a constant value (at least larger than K squared) similarly to the expression (3). At whatever position the optical head 3 crosses within the ID area, the sum-of-squares signal represents a constant value (or larger value). As a result, the guide pattern detected signal is provided, as shown in FIG. 4, through the comparison of the sum-of-squares signal with a reference value (threshold) $V_{TH}$.

In a guide pattern detecting circuit 25a, which is shown in FIG. 5, installed in the tracking control circuit 25, a sum of the outputs of the guide pattern light receiving elements 8-E1 to 8-E5, ΣEn (n=1 to 5), is converted from a current into a voltage by an I-V converter 31a. A sum of the outputs of the odd-numbered light receiving elements for clock signal production 8-B1, B3, B5, B7, and B9, and a sum of the outputs of the even-numbered light receiving elements for clock signal production 8-B2, B4, B6, B8, and B10; that is, B2n−1 and B2n (n ranges from 1 to 5) are converted from currents to voltages by I-V converters 31b and 31c.

The sums of outputs, ΣEn, and ΣB2n−1 and ΣB2n, which have been converted from currents to voltages, are supplied to differential amplifiers 32a and 32b. The differential amplifier 32a outputs (ΣEn−ΣB2n−1), while the differential amplifier 32b outputs (ΣEn−B2n).

The differential outputs, (ΣEn−ΣB2n−1) and (ΣEn−ΣB2n), are supplied to low filters 33a and 33b respectively, whereby dc components are removed so as to provide a wide dynamic range. These differential signals are fed to multipliers 34a and 34b, and then squared. The squared signals are then added up by a adder 35, and provided as a sum-of-squares output 37. The sum-of-squares output 37 becomes an input of a reversed terminal of a comparator 36. The comparator 36 has a reference value $V_{TH}$ at its unreversed terminal. The sum-of-squares output 37 is compared with the reference value $V_{TH}$. As a result, a guide pattern detected signal $\overline{Gdet}$ 38 is provided. A line "—" of $\overline{Gdet}$ means that the signal has a negative logic.

As for the operations of the guide pattern detecting circuit 25a, as shown in FIG. 6, focus servo leading is carried out according to a method to be described later. Thereafter, the optical head 3 is moved across tracks (in a seek direction) in the ID area 152. While the recording/regenerating point of the optical head 3 is running in any place except the guide patterns 155, the quantities of light entering light receiving elements for B and E clock production are equal to each other. The differential outputs (ΣEn−ΣB2n−1) and (ΣEn−ΣB2n) become zero. An output of a sum of squares of these outputs therefore becomes substantially zero.

As the recording/regenerating point of the optical head 3 crosses a guide pattern 155, a sum-of-squares output increases. When the point comes to the center of the guide pattern 155, the sum-of-squares output has a maximum amplitude.

The reference value VTH for the comparator 36 is set to a higher value as shown in FIG. 6 so as to be unsusceptible to the influence of variations in quantities of received light due to dust, finger prints, defects, or the like. This prevents occurrence of noises and enables the guide pattern detected signal $\overline{Gdet}$ 38 to develop only around the center of a track.

The guide pattern detected signal $\overline{Gdet}$ 38 is produced by multiple light receiving elements, which therefore is unsusceptible to dust, finger prints, defects, or the like. Crossing a track can be identified by counting pulses of the guide pattern detected signal $\overline{Gdet}$ 38 alone. Track search can therefore be achieved unaffected by the track number patterns 156 (8 bits) and track identification patterns 157 (8 bits).

As for track search, a zero cross signal of a TE signal shown in FIG. 7b and the guide pattern detected signal Gdet 38 (FIG. 7a) may be ANDed.

In this embodiment, when a track is searched for on a recording medium such as the one shown in FIG. 21, multiple light receiving elements formed along tracks are used to detect the crossing of a guide pattern 155 across tracks. Thus, a track detected signal is output only around the center of a track (guide pattern). This embodiment therefore permits accurate track search unaffected by multiple information patterns and unsusceptible to dust, finger prints, defects, of the like.

In this embodiment, the reference value $V_{TH}$ for the comparator is set rather high so that track search will be unaffected by the variations in quantities of received light due to dust, finger prints, defects, of the like existent on the optical card 1. The guide pattern detected signal is therefore output only around the center of a track.

Figure 8:
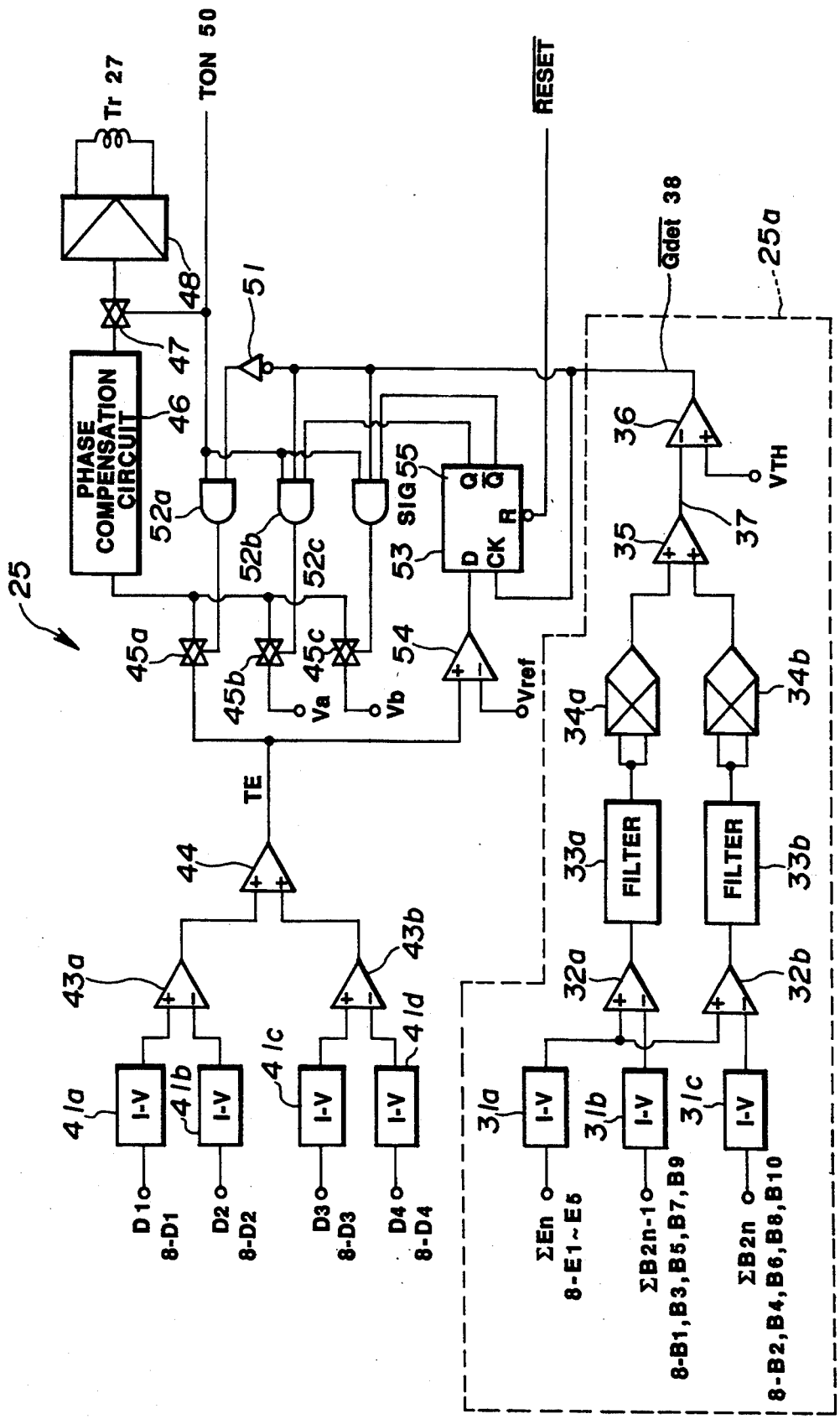
Figure 23:
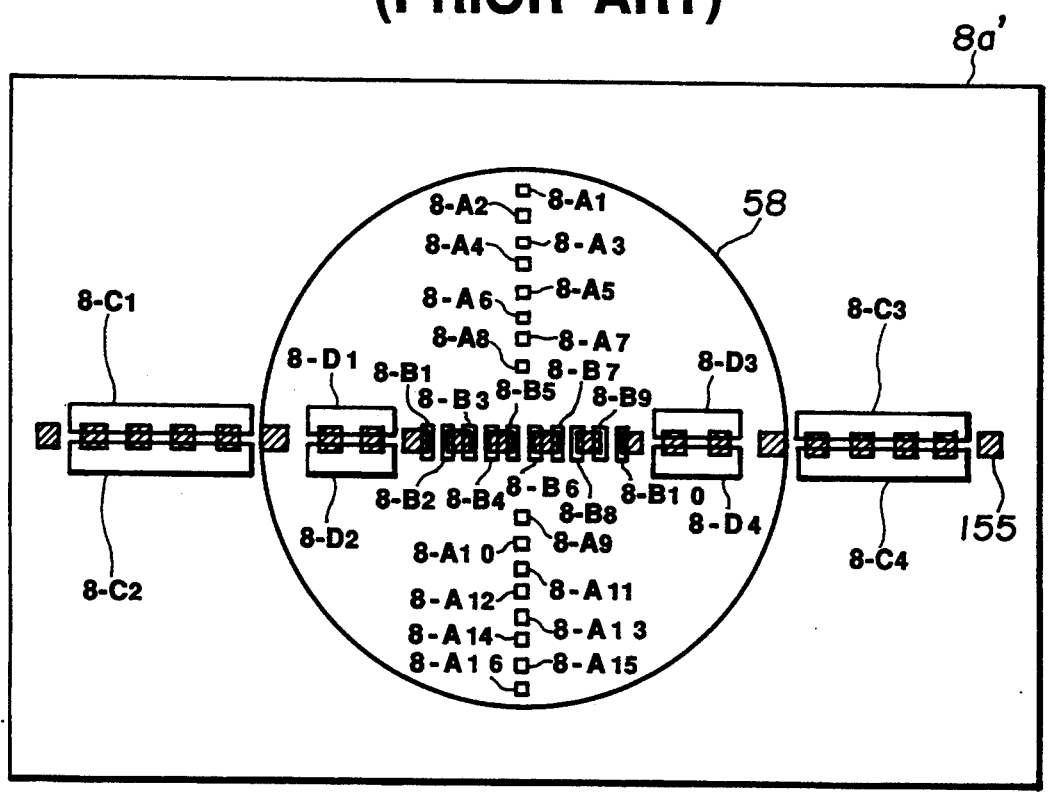
Figure 24:
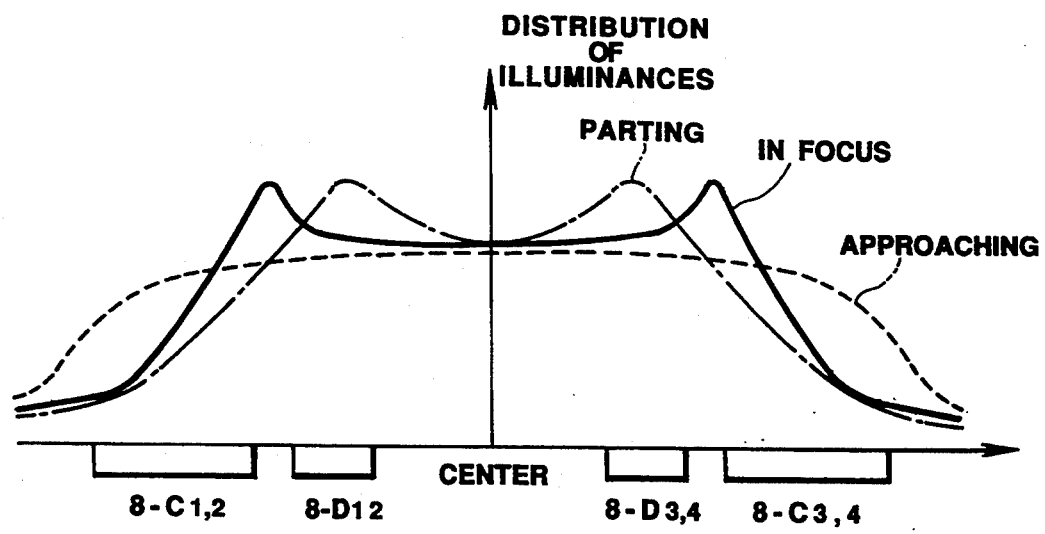
Figure 25:
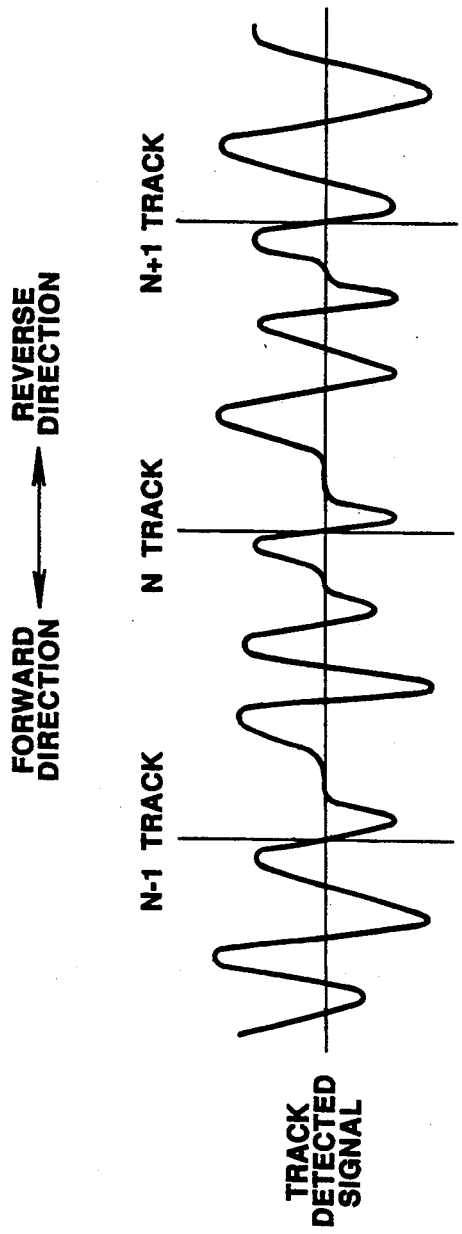

The tracking control circuit 25 controls tracking servo leading and tracking. As shown in FIG. 8, the outputs D1 to D4 of the light receiving elements for servo signal detection 8-D1 to 8-D4 within a light spot are converted from currents to voltages by I-V converters 41a, 41b, 41c, and 41d, and then supplied to differential amplifiers 43a and 43b. The differential outputs (D1−D2) and (D3−D4) of the light receiving elements for servo signal detection located on the upper and lower edges of the guide patterns 155 in FIG. 23 are output from the differential amplifiers 43a and 43b. The differential outputs (D1−D2) and (D3−D4) become tracking error signals TE1 and TE2 which are usable independently.

An adder 44 adds up the tracking error signals TE1 and TE2 to produce a tracking error signal TE. Thus, a more reliable tracking error signal TE is provided.

The tracking error signal TE is input to an analog switch 45a. A specified positive-polarity voltage Va (positive potential relative to a circuit operation potential $V_{ref}$) and a specified negative-polarity voltage Vb (negative potential relative to a circuit operation potential $V_{ref}$) are supplied to analog switches 45b and 45c.

The TE signal, specified positive-polarity voltage Va, or specified negative-polarity voltage Vb is supplied selectively to a phase compensation circuit 46 via the analog switches 45a, 45b, or 45c. The phase compensation circuit 46 compensates for the phase of an input signal in order to stabilize the tracking servo system.

The signal passing through the phase compensation circuit 46 is supplied to a drive circuit 48 via an analog switch 47 which makes or breaks the system in response to a control signal TON 50 sent from the control circuit 30. The drive circuit 38 amplifies the power of an input signal and supplies the amplified signal to the tracking coil 27 in the optical head 3. The objective lens 15 is driven across tracks by the tracking coil 27.

A guide pattern detected signal $\overline{Gdet}$ 38 sent from the guide pattern detecting circuit 25a is supplied to ones of the input terminals or AND gates 52b and 52c, and to a clock input terminal CK of a D-type flip flop. The guide pattern detected signal $\overline{Gdet}$ 38 is also fed to an AND gate 52a of an inverter 51. On the other hand, the TE signal is supplied to an unreversed input terminal of a comparator 54, and then compared with a reference value $V_{ref}$ fed to the reversed input terminal thereof. The resultant output is input to the data input terminal D of the D-type flip flop 53.

An output Q (SIG) 55 of the D-type flip flop 53, which holds the polarity of the TE signal at the leading edge of the guide pattern detected signal Gdet 38, is supplied to the other input terminal of the AND gate 52b. A reversed output Q is supplied to the other input terminal of the AND gate 52c. An output of the D-type flip flop 53 is initialized with a control signal RESET sent from the control circuit 30.

The TON signal 50 sent from the control circuit 30 is supplied to the other input terminals of the AND gates 52a, 52b, and 52c. The outputs are supplied to the control terminals of the analog switches 45a, 45b, and 45c. The analog switch 45a, 45b, or 45c selectively outputs the TE signal, specified voltage Va, or specified voltage Vb.

Table 1 lists the conditions for conduction of the analog switches 45a, 45b, and 45c, and the truth values of signals selected under the respective conditions.

TABLE 1

| TON 50 | Gdet 38 | SIG 55 | On-channel analog switch | Selected signal |
|---|---|---|---|---|
| 0 | x | x | All off | — |
| 1 | 0 | 0 | 45a | TE signal |
| 1 | 0 | 1 | 45a | TE signal |
| 1 | 1 | 0 | 45c | Va signal |
| 1 | 1 | 1 | 45b | Va signal |

In Table 1, 0 represents a low level, 1 represents a high level, and x means "Don't care."

As shown in Table 1, when a servo loop switching signal TON 50 is 0 (break), all analog switches are off. When the servo loop switching signal TON 50 is 1 (make), any of the signals is selected. The selection is achieved as follows:

When the guide pattern detected signal $\overline{\text{Gdet}}$ 38 is 0 (detected), the analog switch 45a is turned on to select the TE signal. At this time, the TE signal is selected irrelevant of the polarity of the TE signal; that is, whether SIG 55 is 0 or 1.

When the guide pattern detected signal $\overline{\text{Gdet}}$ 38 is 1 (not detected) and SIG 55 is 0 (the TE signal has a negative polarity), the analog switch 45c is turned on to select the specified voltage Vb. On the other hand, when SIG 55 is 1 (positive polarity), the analog switch 45b is turned on to select the specified voltage Va.

FIG. 9 shows waves for explaining the operations to be performed after the optical head 3 is moved across tracks in the ID area 152 and before tracking servo leading is carried out.

FIG. 9A shows a wave occurring when the optical head 3 is moved in the forward direction (in a direction in which the track number gets larger). FIG. 9B shows a wave occurring when the optical head 3 is moved in the reverse direction (in a direction in which the track number gets smaller).

In FIG. 9A, when the optical head 3 performs coarse seek by monitoring track numbers or counting the number of crosses of a zero line by the TE signal, if the optical head 3 detects a target position (the center of a guide pattern in a target track); that is, if the TON signal 50 is high, the servo system is made. At this time, the guide pattern detected signal $\overline{\text{Gdet}}$ 38 is low, and the objective lens 15 is aligned with the target position (point O) according to the TE signal.

However, when the acceleration of the objective lens 15 surpasses the braking force of the tracking servo system, if the objective lens 15 passes through positions represented as points O, A, E, and F in FIG. 9A, the phase of the TE signal shifts 180°. Consequently, leading the objective lens 15 to a position represented as the point O in FIG. 9A fails. The control circuit 30 drives the SIG signal 55 to high at the leading edge (point A) of the guide pattern detected signal $\overline{\text{Gdet}}$ 38 changing from low to high. Thus, the objective lens 15 is driven according to the specified voltage Va. When the objective lens 15 is kept driven according to the specified voltage Va, the braking force is balanced with the force derived from the acceleration of the objective lens 15 at a point E in FIG. 9A. The objective lens 15 is then controlled so as to be returned to a position represented as a point A' in FIG. 9A owing to the braking force (herein, the points A and A' represent the same position, and have a time lag between them. This is true for the description below.).

The guide pattern detected signal $\overline{\text{Gdet}}$ 38 goes to low again at the point A' in FIG. 9A. The objective lens 15 is then controlled according to the TE signal. The objective lens 15 is therefore moved from a position represented as the point A' to a position represented as a point O', and then aligned with the target position (point O').

In FIG. 9B, the control circuit 30 extends control so that the SIG signal 55 will be driven low at the leading edge (point B) of the guide pattern detected signal $\overline{\text{Gdet}}$ 38 changing from low to high. This causes the objective lens 15 to be driven according to the specified voltage Vb. After the forces are balanced at a point L in FIG. 9B, the specified voltage Vb is applied until the objective lens 15 is returned to the position represented as the point B'. The guide pattern detected signal $\overline{\text{Gdet}}$ 38 goes to low at the point B' in FIG. 9B, whereby the objective lens 15 is then controlled according to the TE signal and aligned with the target position (point O' in FIG. 9B).

As described above, in this embodiment, the TE signal is selected in a region between the positions represented as the points A and B (corresponding to a substantially linear portion of the TE signal) in which the guide pattern detected signal Gdet 38 is detected. In this embodiment, the specified voltage Va (positive polarity) or Vb (negative polarity) is selected in any region (region between or beyond the positions represented as the points A and F or B and M) except the detection region between the positions represented as A and B. The objective lens 15 is then moved forcibly to the target position (center of a guide pattern). The objective lens 15 will therefore not be led to an incorrect position but be led to the target position accurately and promptly.

Next, the second embodiment will be described. The second embodiment is substantially identical to the first embodiment. Differences are the arrangement of light receiving elements for clock production in a photodetector and the circuitry of a guide pattern detecting circuit. The same components will bear the same numerals, of which description will be omitted.

Figure 10:
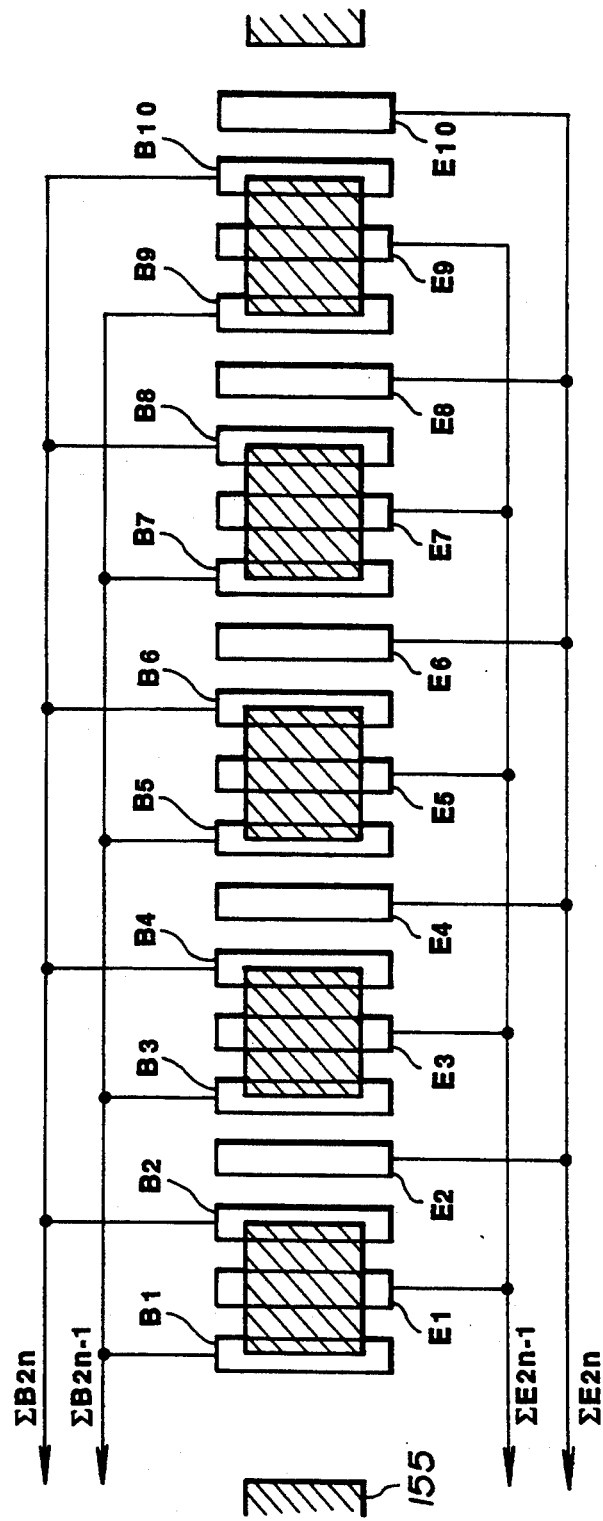

The arrangement of light receiving elements for clock production in the photodetector 8 in the second embodiment is similar to that in the first embodiment. That is to say, as shown in FIG. 10, the photodetector 8 includes light receiving elements for clock signal production B1 to B10 (hereinafter, light receiving elements for B-clock signal production) that produce a clock signal serving as a synchronizing signal for reading and writing data on the basis of the images of guide patterns 155. In addition, light receiving elements E1 to E10 for E-clock production are installed in order to produce an E clock signal having a phase difference of 90° from the B clock signal.

Among the light receiving elements for B-clock signal production B1 to B10, odd-numbered elements or even-numbered elements are coupled mutually. The output of each of the odd-numbered elements or even-numbered elements is represented as B2n−1 or B2n (where n ranges from 1 to 5). The sum of the outputs of the odd-numbered elements or even-numbered elements is represented as ΣB2n−1 or ΣB2n (where, n ranges from 1 to 5). An output B2n−1 (or ΣB2n−1) and an output B2n (or ΣB2n) has, as apparent from the layout of respective light receiving elements, a phase difference of 180° from each other.

Among the light receiving elements for E-clock production E1 to E10, odd-numbered elements or even-numbered elements are coupled mutually. The output of each of the odd-numbered elements or even-numbered elements is represented as E2n−1 or E2n (where, n ranges from 1 to 5). The sum of the outputs of the odd-numbered elements or even-numbered elements is represented as ΣE2n−1 or ΣE2n (where, n ranges from 1 to 5). The sums of the outputs ΣE2n−1 and ΣE2n have, as apparent from the layout of the respective light receiving elements, a phase difference of 180° from each other.

The reason why the foregoing sums of outputs are employed is to prevent the occurrence of a missing regenerative signal from a light receiving element due to dust, defects, or the like on a recording medium. A difference between the sums of outputs, (ΣE2n−1−ΣE2n) or (ΣB2n'1−ΣB2n), is employed to cancel out noises in a transmission system.

Even one light receiving element for B-clock production and one light receiving element for E-clock production enable track detection to be mentioned below. For higher reliability, the aforesaid processing is a must.

Figure 11A:
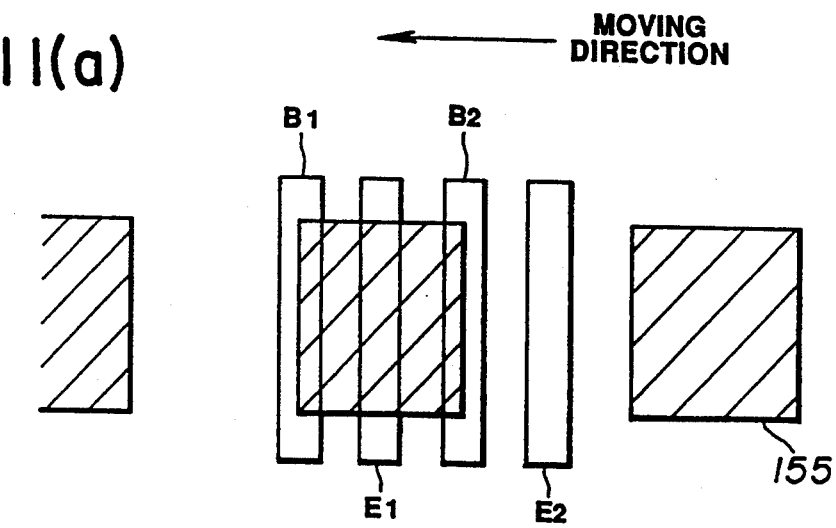
Figure 11B:
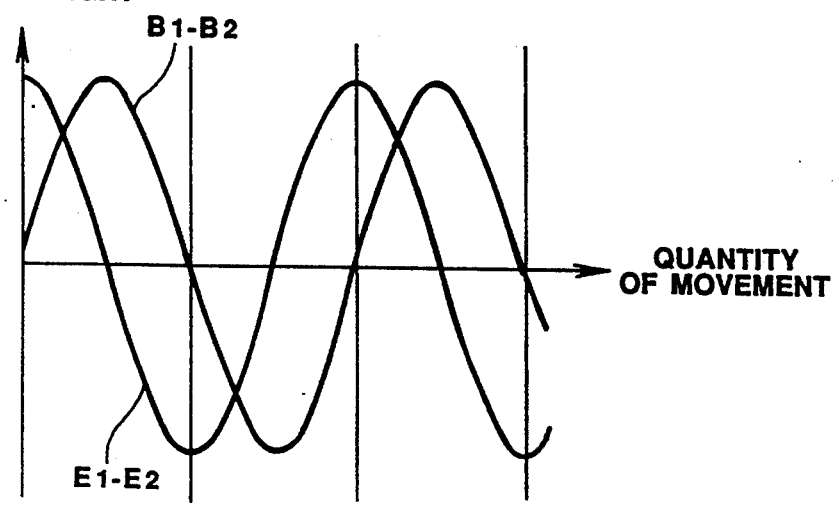

FIG. 11 shows the relationship between the outputs of light receiving elements and the quantity of movement of the optical head 3, wherein the recording-/regenerating point of the optical head 3 is moved on guide patterns 155 along tracks. For simple description, FIG. 11a shows the layout of a pair of light receiving elements for B-clock production B1 and B2, a pair of light receiving elements for E-clock production E1 and E2, and guide patterns 155. FIG. 3b shows waves of an output difference (B1−B2) and of an output difference (E1−E2).

When the recording/regenerating point of the optical head 3 is moved on the guide patterns 155 along tracks, a difference A between the outputs of the pair of light receiving elements for B-clock production B1 and B2 (B1−B2 in FIG. 11) is represented as $K\operatorname{l}\sin\omega t$ (K denotes a constant). A difference B between the outputs of the pair of light receiving elements for E-clock production E1 and E2 (E1−E2 in FIG. 11) is represented as a wave having a difference of 90° from that of the output difference A. The output differences A and B are represented as follows:

$$A = \Sigma B2n-1 - \Sigma B2n = Kl\sin\omega t$$ (K denotes a constant)

$$B = \Sigma E2n-1 - \Sigma E2n = Kl\sin(\omega t + p/2) = Kl\cos\omega t \quad (7)$$

The sum of squared A and B is:

$$A^2 + B^2 = Kl^2 \quad (8)$$

The sum of squared signals A and B is constant.

For simple description, the output differences A and B are regarded as perfect sine waves. In reality, however, the output differences A and B are not represented as perfect sine waves but as periodic functions having a characteristic similar to the sine wave. The output differences A and B will therefore not be zero. The sum of squared A and B exceeds a certain constant; that is, $A^2 + B^2 > Kl^2$.

When the ID area 152 except the guide patterns 155 is moved across tracks (perpendicularly to tracks), the quantities of light received by the guide pattern light receiving elements and the light receiving elements for clock production become equal to each other. That is to say:

$$\Sigma E2n-1 = \Sigma E2n = \Sigma B2n-1 = \Sigma B2n \quad (9)$$

The sum of squared A and B becomes substantially zero.

Assuming that the optical head 3 is moved across tracks in the ID area 152 to search for a track, only when the recording/regenerating point of the optical head 3 crosses the center of a guide pattern 155 irrelevant of the position along tracks, a substantially constant homopolarity output is provided. The provided output can be used as a guide pattern detected signal or a signal representing that the crossing of the center of a guide pattern 155 has been detected.

Figure 12:
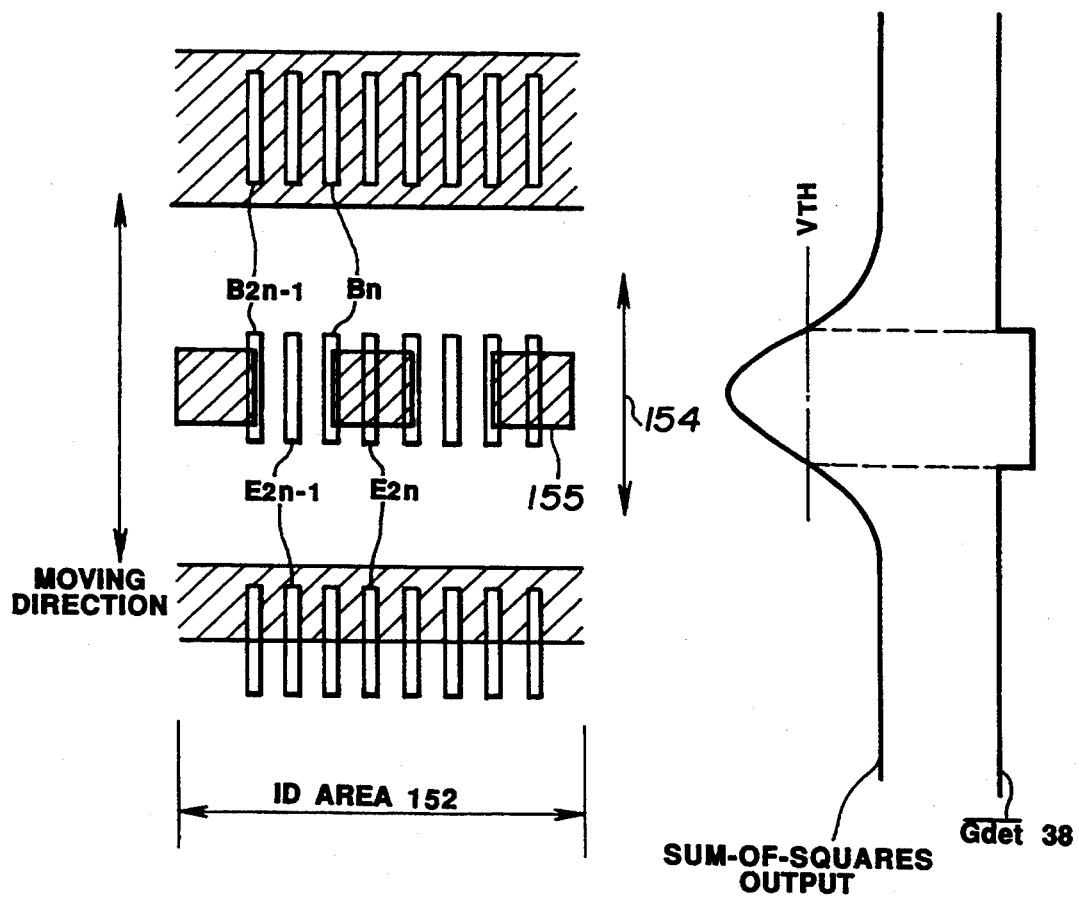

FIG. 12 shows the relationships between the locations of light receiving elements, and the sum-of-squares signal and guide pattern detected signal, wherein the optical head 3 is moved across tracks in the ID area 152 to search for a track. The sum-of-squares signal is defined as:

$$(\Sigma B2n-1-\Sigma B2n)^2 + (\Sigma E2n-1-\Sigma E2n)^2 \quad (10)$$

While the recording/regenerating point of the optical head 3 is running in any place except the guide patterns 155, since the quantities of light entering light receiving elements are equal to one another, the sum-of-squares output becomes substantially zero. As the recording-/regenerating point of the optical head 3 crosses a guide pattern 155, the sum-of-squares output increases. When the recording/regenerating point comes to the center of the guide pattern 155, the sum-of-squares output has a maximum amplitude. The expression (10) provides, similarly to the expression (8), a constant value (at least larger than squared Kl). At whichever position is crossed within the ID area, the sum-of-squares signal assumes the constant value (or larger value). As a result, the guide pattern detected signal is provided, as shown in FIG. 12, through the comparison of the sum-of-squares signal with a reference value (threshold) $V_{TH}$.

The sum of squares of a B-clock signal produced by the light receiving elements for B-clock production B1 to B10 and an E-clock signal produced by the light receiving elements for E-clock production E1 to E10 becomes constant. This means that when the optical head 3 moves across tracks, a constant output is provided at any position along tracks. For the movement across tracks within the width of the ID area 152, when the outputs of B light receiving elements and those of E light receiving elements are squared and added up, a constant output is provided all the time.

As described above, assuming that the optical head 3 is moved across tracks, only when the recording-/regenerating point of the optical head 3 passes through the center of a guide pattern 155, a substantially constant homopolarity output is provided irrelevant of the position along tracks.

In the guide pattern detecting circuit 25b of the second embodiment, as shown in FIG. 13, the sums of the outputs of odd-numbered elements out of the light receiving elements for B-clock signal production B1 to B10 and of even-numbered elements thereof, $\Sigma B2n-1$ and $\Sigma B2n$ (where, n ranges from 1 to 5), are converted from currents into voltages by I-V converters 61a and 61b. The voltage signals converted by the I-V converters 61a and 61b are supplied to a differential amplifier 32a. The difference between the voltage signals is then amplified.

The sums of the outputs of odd-numbered elements out of the light receiving elements for E-clock production E1 to E10 and of even-numbered elements thereof, $\Sigma E2n-1$ and $\Sigma E2n$ (where, n ranges from 1 to 5), are converted from currents into voltages by I-V converters 61c and 61d. The voltage signals converted by the I-V converts 61c and 61d are supplied to a differential amplifier 32b. The difference between the voltage signals is then amplified.

The outputs of the differential amplifiers 32a and 32b are supplied to low filters 33a and 33b respectively, whereby dc components are cut off to permit a wide dynamic range in subsequent stages. The low filters 33a and 33b output a B-clock signal $S_B$ and an E-clock signal $S_E$ respectively. These clock signals $S_B$ and $S_E$ are supplied to multipliers 34a and 34b, and then squared. The clock signals $S_B$ and $S_E$ are then added up by an adder 35, thus providing a sum-of-squares output 37. The sum-of-squares output 37 is fed as a reversed input to the comparator 36, and compared with the reference value $V_{TH}$ serving as an unreversed input. This results in a guide pattern detected signal $\overline{Gdet}$ 38. With the guide pattern detected signal $\overline{Gdet}$ 38, similarly to the first embodiment, a guide pattern is detected and tracking servo leading is controlled.

The other components, the operation, and the advantages are identical to those of the first embodiment.

Next, the third embodiment will be described. The third embodiment is substantially identical to the first embodiment except the components of an optical head and the circuitry of a drive control circuit in the optical head. The same components will bear the same numerals, of which description will be omitted.

An optical card apparatus 2a of the third embodiment comprises, as shown in FIG. 14, a recording head 71 for recording information on the optical card 1 and a regenerating head 72 for regenerating information from the optical card 1. Similarly to the first embodiment, the semiconductor laser (LD) 10 installed in the recording head 71 is driven only for recording, while the light emitting diode (LED) 9 installed in the regenerating head 72 is driven for recording and regenerating.

The optical card 1 is driven along tracks (in the longitudinal direction thereof) by the card motor 4 under the control of the card motor control circuit 6, while the regenerating head 72 is driven perpendicularly to tracks (in the seek direction) by a head motor 1 (73) under the control of a head motor 1 control circuit 75.

The regenerating head 72 is also driven along tracks through a head motor 2 (77) by a head motor 2 control circuit 76. The optical axis of the recording head 71 locked in a frame, which is not shown, of the optical card apparatus 2a is perpendicular to the optical axis of the regenerating head 72 oriented along tracks. The optical axes are adjusted to lie on the same plane. That is to say, only the regenerative head 72 is moved in the seek direction by the head motor 1 (73) or along tracks by the head motor 2 (77).

In the regenerative head 72, light from the LED 9 controlled by the drive circuit 11 is recomposed by a collimator lens 81 and becomes substantially parallel light. After transmitted by a dichroic mirror 82 and a half prism 83, the light is reflected by a reflecting prism 84. The reflected light is then projected onto the optical card via an objective lens 85, thus broadly spotlighting the width of a track. The light reflected from the optical card 1 is reflected by the objective lens 85, reflecting prism 84, and half prism 83, and then received by the photodetector 8 (8a) via an image formation lens 86.

Light originating from the semiconductor laser 10 which is controlled by the demodulating circuit 18 and drive circuit 19 is recomposed by a collimator lens 87 and becomes substantially parallel light. The parallel light is reflected by the dichroic mirror 82 in the regenerating head 72. After transmitted by the half prism 83, the light is reflected by the reflecting prism 84. After passing through the objective lens 85, the reflected light is projected as a microscopic recording beam onto the optical card 1 within a region illuminated by the LED 9. The recording surface of the optical card 1 is then changed physically to record information. The reflected light is received by the photodetector 8 (8a) via the objective lens 85, reflecting prism 84, half prism 83, and image formation lens 86.

The surface of the dichroic mirror 10 is provided with, for example, specified coating so as to transmit the light originating from the LED 9 (having a wavelength of 860 nm) efficiently, and reflect the light originating from the semiconductor laser 10 (having a wavelength of 780 nm) efficiently.

A detected signal converted into an electric signal by the photodetector 8 (8a) is fed to the demodulating circuit 23. The demodulating circuit 23 outputs a read signal serving as a regenerative signal and a clock signal serving as a timing reference for recording or regenerating.

Part of the detected signal is applied to the focus control circuit 24 and tracking control circuit 25 (25a). A focus error signal and a tracking error signal are then produced and applied to the focus coil 87 and tracking coil 88 in the regenerative head 72 via the drive circuit (not shown). Based on the error signals, the objective lens 85 is driven toward parting from or approaching to the optical card, and in the seek direction. Thus, autofocus control and tracking control are achieved.

The components of the photodetector 8 (8a) and the circuitry of the tracking control circuit 25 (25a) are identical to those in the first or second embodiment.

Figure 15:
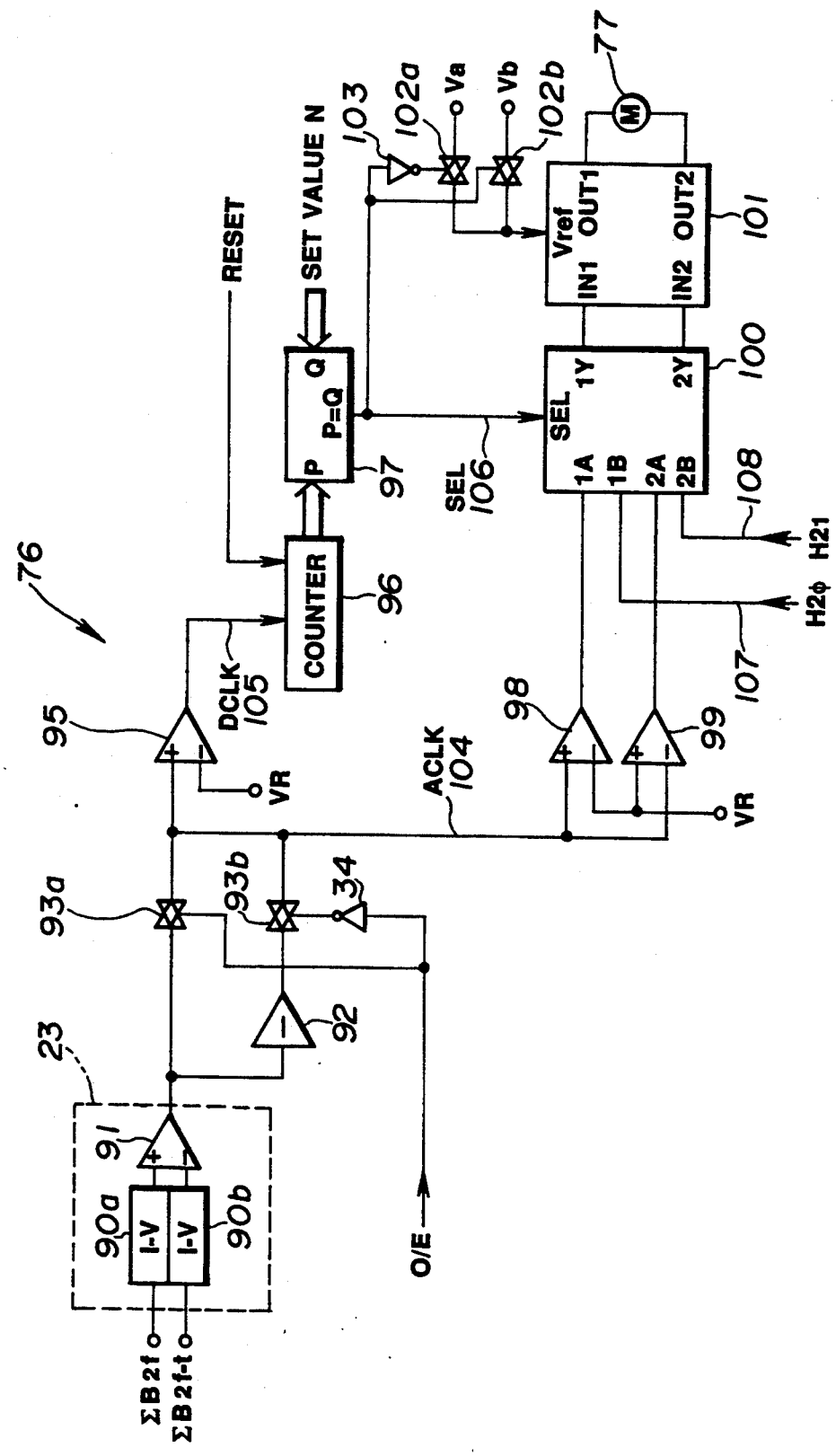

In the head motor 2 control circuit 76, which is shown in FIG. 15, for controlling alignment of the regenerative head 72 along tracks, a sum of quantities of light of odd-numbered light receiving elements, which is incident light of light receiving regions for clock production in the photodetector 8, $\Sigma B2j$, and a sum of quantities of light of even-numbered light receiving elements, $\Sigma B2j-1$, are converted into voltages by I-V converters 90a and 90b, and then supplied to a differential amplifier 91. The output of the differential amplifier 91 is supplied to an analog switch 93a and to an analog switch 93b via a reversing unit 92.

The output of the analog switch 93a or 93b is supplied as an analog clock signal ACLK 104 to a comparator 95, and then compared with a reference voltage $V_R$ with which the circuit operates. A digital clock signal DCLK 105 is then output to a counter 96. The control circuit 30 selects either of the outputs of the analog switches 93a and 93b depending on a control signal Odd or Even.

The counter 96 inputs the DCLK signal 105 representing position information of the optical card 1, and a reset signal RESET for initializing the count which is sent from the control circuit 30. The output of the counter 96 is fed to one (P) terminal of a comparator 97, and a set value N (target position) with which the count is compared is fed from the control circuit 30 to the other (Q) terminal thereof. A consistency signal SEL 106 is supplied as a result of the comparison to the select terminal SEL of a selector 100, and to the control terminals of analog switches 102a and 102b via an inverter 103. Either specified voltage Va or Vb (Va>Vb) is supplied to an output voltage control terminal $V_{ref}$ of a drive circuit 101, thus controlling the rotating speed of the head motor 2 (77).

The ACLK signal 104 is red to a plus terminal of a comparator 98 and to a minus terminal of a comparator 99, and then compared with the reference voltage $V_R$. The outputs of the comparators 98 and 99 are fed to terminals 1A and 2A or the selector 100. Drive signals H20 (107) and H21 (108) for controlling drive of the regenerating head 72 for PWM are fed from the control circuit 30 to terminals 1B and 2B of the selector 100. Input signals 1A and 2A or 1B and 2B selected at the select terminal SEL of the selector 100 are supplied to the drive circuit 101 via output terminals 1Y and 2Y, causing the head motor 2 (77) to rotate.

Table 2 lists the control logic of the drive circuit 101 and the operating states of the head motor 2 (77).

TABLE 2

| SEL | 2B | 1B | 2A | 1A | Operating State |
|---|---|---|---|---|---|
| L | L | L | x | x | Brake |
| L | L | H | x | x | Reverse direction (CCW) |
| L | H | L | x | x | Forward direction (CW) |
| L | H | H | x | x | Stop |
| H | x | x | L | L | Brake |
| H | x | x | L | H | Reverse direction (CCW) |
| H | x | x | H | L | Forward direction (CW) |
| H | x | x | H | H | Stop |

In Table 2, L denotes a low level, H denotes a high level, and x means "Don't care."

In the aforesaid circuitry, first of all, the operations for controlling alignment of the regenerative head 72 along tracks will be described in conjunction with the timing chart of FIG. 16. It is assumed that a target position is located in the forward direction of a current position (point O), and a required number of pulse edges of the DCLK signal 105 is six (even). The numerals in FIG. 16(2) and 16(4) represent the numbers of clock edges that has passed since the point O, or edge numbers (excluding the point O).

When the number of pulse edges is six, the breakdown of the edges is as follows:

3 ↓ edges+3 ↑ edges=6 edges (even)

When the number of pulse edges is five, the breakdown of the edges is as follows:

2 ↓ edges+3 ↑ edges=5 edges (odd)

Figure 16:
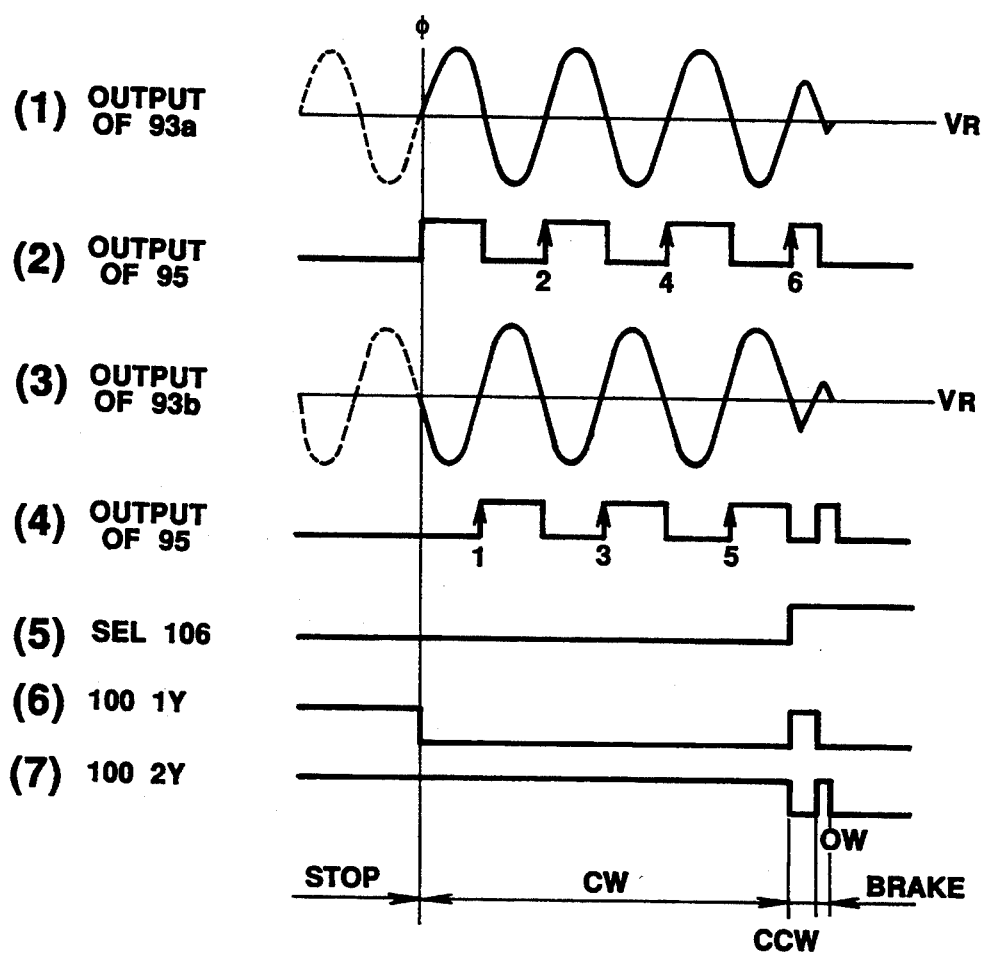

The edge numbers correspond to the numerals in FIGS. 16(2) and 16(4).

The terms of the forward and reverse directions are employed for convenience sake. Any definitions can apply. Herein, the forward direction means a direction toward +11 and +12 in FIG. 17(C), which will be described later, and the reverse direction means a direction toward −11 and −12 in FIG. 17(C).

In order to agree the current position (point O) with an edge of the DCLK signal 105, the optical card 1 is inched along tracks and thus aligned while tracking any track. Specifically, the LED 9 is turned on (semiconductor laser 10 is off) to emit light, and the light is led to track any track. This leading control for tracking is performed by the tracking control circuit 25 (25a) described in the first or second embodiment, of which description will be omitted. The stopping accuracy may not be very high as long as a succeeding edge can be detected. The card motor 4 may be driven, and then stopped when an edge of the clock signal DCLK 105 is detected. The semiconductor laser 10 is actuated to project light onto the card with an unwritable low output. At this time, tracking is performed according to an error signal TE2=D3−D4.

As the regenerative head 72 is moved along tracks, the recording beam moves in the seek direction. When the quantities of light entering the light receiving areas for servo signal detection 8-D1 and 8-D2 become equal to each other, the head motor 2 (77) is stopped (FIG. 18). Tracking is then performed according to a normal error signal TE=(D1+D3)−(D2+D4).

The position at which the head motor 2 (77) is stopped (absolute position set after the recording beam has moved from the data area to the K-pulse ID area) will thereafter be regarded as an original point.

Next, the control circuit 30 sets the number of pulses N (N=3) associated with the target position in the comparator 97, and selects the ACLK signal 104 shown in FIG. 16(1) or the DCLK signal 105 shown in FIG. 16(2) as a control signal Odd or Even that is low (high active in the forward direction, Even=low active in the reserve direction). The regenerative head 72 is then driven in the forward direction (CW). The consistency signal (SEL) 106 of the comparator 97 is low in an initial state, because the count of the counter 96 is inconsistent with the set number N. The selector 100 selects drive signals H20 (107) and H21 (108).

After initializing the count of the counter 96, the control circuit 31 drives H20 107 to a low level and H21 (108) to a high level, and rotates the head motor 2 (77) in the forward direction (CW). When the head motor 2 (77) is rotated in the forward direction, the DCLK signal 105 is fed to the counter 96. The number of clocks is then counted.

When the counter 96 has counted N pulses (the regenerative head 72 has moved to the target position), the comparator 97 drives the consistency signal SEL 107 to the high level (FIG. 16(5)). The selector 100 selects the outputs of the comparators 98 and 99. The outputs of the comparators 98 and 99 are fed to the input terminals IN1 and IN2 of the driver 101. The head motor 2 (77) is driven in the reverse direction (CCW)

and forward direction (CW), and then braked by creating a short circuit (FIG. 16(6) and (7)). Thus, the regenerative head 72 is stopped at a target leading edge of the DCLK signal 105.

Alignment of the regenerative head 72 along tracks is controlled as mentioned above, whereby the recording beam is aligned.

Figure 17A:
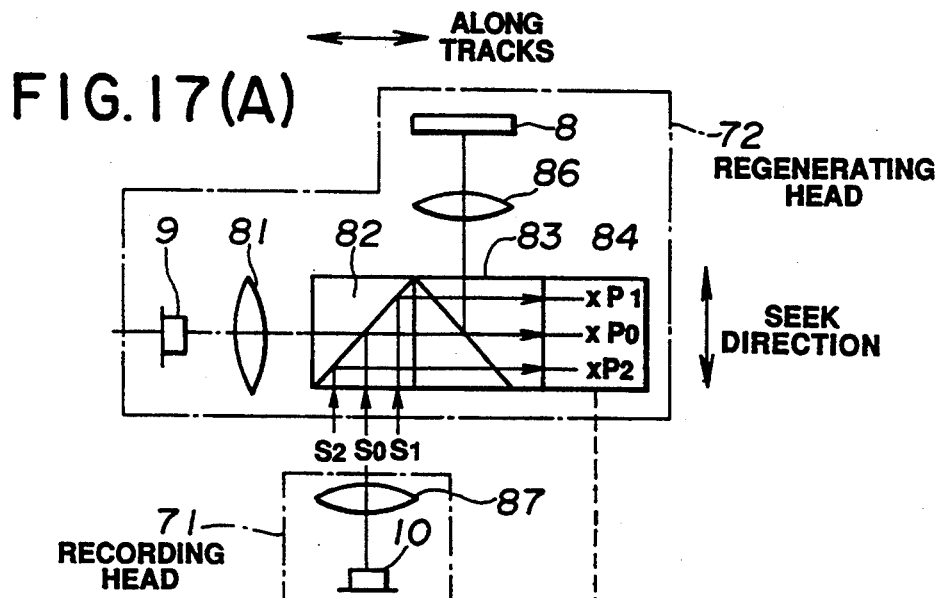
Figure 17B:
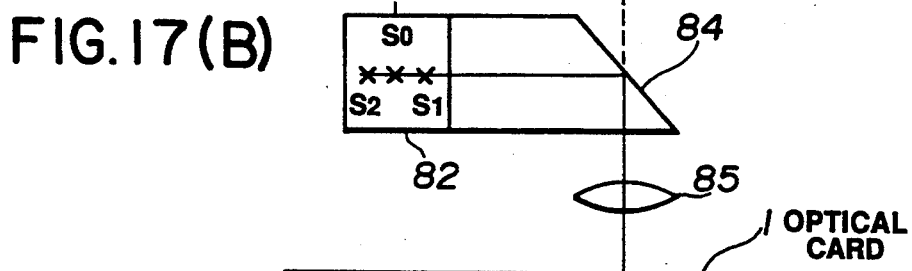
Figure 17C:
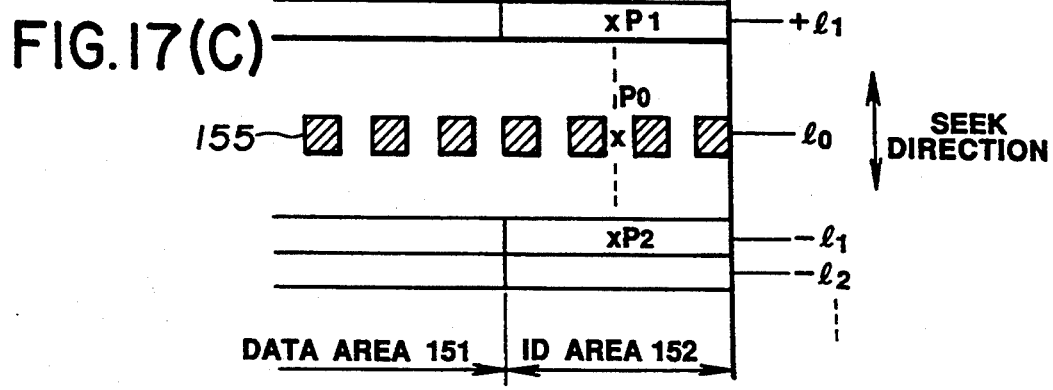

In FIGS. 17(A) and 17(C), light S0 emitted from the semiconductor laser 10 in the recording head 71 is reflected by the dichroic mirror 82, transmitted by the half prism 83, reflected by the reflecting prism 84, and then projected as a recording beam onto a position P0 in the ID area 152 of the optical card 1.

When the regenerative head 72 is moved along tracks (sideways in FIG. 17), the light emitted from the semiconductor laser 10 shifts to S1 or S2. The light is then projected as a recording beam onto a position P1 or P2 on the optical card 1. When the regenerative head 72 is aligned along tracks, the recording beam projected onto the optical card 1 can be aligned in the seek direction.

Since the pitch along tracks between adjacent guide patterns 155 is equal to the pitch in the seek direction between adjacent recording lines (distance between 11 and 12 in FIG. 17(C)), when the regenerating head 72 is aligned according to a clock signal produced depending on a guide pattern 155, the light emitted from the semiconductor laser 10 can be aligned with a recording line and the recording beam can thus be projected onto the optical card 1.

When the regenerating head 72 is aligned along tracks using guide patterns lined up along tracks as position information, the recording beam can be aligned with any recording line perpendicular to tracks (in the seek direction).

Initial alignment of a recording beam may be controlled mechanically. Alternatively, as shown in FIG. 18, the optical card 1 may be inched to stop at a position corresponding to an edge of the DCLK signal 105. Thereafter, tile recording beam is projected, and the regenerative head 72 is aligned along tracks so that the quantities of light in the light receiving regions 8-D1 and 8-D2 for servo signal detection within the beam will be equal to each other. After initial alignment, the recording beam then lies on the recording line 10 in FIG. 17(C).

That is to say, the LED 9 is turned on to emit light (the semiconductor laser 10 is off), and then led to track any track. The card motor 4 is then driven. When an edge of the DCLK signal 105 is detected, the card motor 4 is stopped (as long as a succeeding edge can be detected, the stopping accuracy may not be very high). Next, the light of the semiconductor laser 10 is projected onto the card with an unwritable low output. At this time, tracking is performed according to an error signal TE2=D3−D4. The regenerative head 72 is then moved along tracks. With the movement, the recording beam moves in the seek direction. When the quantities of light entering the light receiving regions for servo signal detection 8-D1 and 8-D2 become equal to each other. The head motor 4 is stopped. Tracking is then performed according to a normal error signal TE=(D1+D3)−(D2+D4). Thus, initial alignment of a recording beam is completed. The alignment is performed only when a card is inserted. Thereafter, alignment is performed merely by counting pulses in the DCLK signal 105.

The operations of an optical card apparatus 2a for a variant of an optical card will be described in conjunction with FIG. 19. The aspect ratio of each guide pattern 155 or a ratio or the size in the seek direction to the size along tracks is 2:1 in an optical card 1a of a variant, while the aspect ratio is 1:1 in the optical card 1 (FIG. 19(A)).

The employment of the optical card 1a of this variant doubles the frequency of the ACLK signal 104 (FIG. 19(B)). The accuracy (resolution) in positioning along tracks improves, and alignment can be done at one edge of the DCLK signal 105. This results in a simple circuitry.

The other advantages and the operation are identical to those of the first embodiment.

As described above, the optical card apparatus 2a of the third embodiment not only provides the advantages of the first embodiment but also permits efficient regenerating of information. Specifically, guide patterns lined up along tracks are used as position information to align a regenerating head or an optical card with a position along tracks, whereby a recording beam can be aligned with any recording line perpendicular to tracks. This enables the recording beam to align with a specified position accurately for a short time, and permits recording of information. During regenerating, information can be regenerated from multiple recording lines concurrently. Eventually, information can be regenerated efficiently.

Since a regenerating head and a recording head is formed in an united body, the recording head can be dismounted to realize a dedicated regenerating apparatus. A compact and low-priced apparatus can be realized.

In the third embodiment, the movement of a recording beam in the seek direction is achieved by moving the recording head 71 which is movable relatively to the regenerating head 72. As long as a light beam moves in the seek direction with the movement of the recording head 71, the locations of the recording head 71, LED 9, and collimator 81 in FIG. 17(A) may be altered. The reflecting prism 84 may not be included.

In this invention, a wide range of difference embodiments can be formed on the basis of the invention without departing from the spirit or scope of the invention. This invention is limited to the appended claims but not restricted by any specific embodiments.

What is claimed is:

1. A track detector circuit designed for an information recording medium having a plurality of tracks each of which includes at least a first area formed by combining areas of different reflectances along tracks, and a second area formed by combining areas of different reflectances perpendicularly to tracks, comprising:
   a light beam moving means for moving a light beam to be irradiated over said first area and said second area along tacks and perpendicularly to tracks;
   a light receiving means for detecting the images of said first area and said second area formed with said light beam irradiated and that is divided into multiple sections along tracks; and
   a cross detecting means, using the detected outputs of said plurality of light receiving means, for detecting the fact that said light beam has crossed the first area, and the fact that said light beam has reached a substantially central portion of the first area.

2. A track detector circuit according to claim 1, wherein said first area consists of guide patterns or areas of different reflectances lined up along tracks at regular intervals; and said plurality of light receiving means are a plurality of light receiving elements set in array at regular intervals along tracks.

3. A track detector circuit according to claim 2; wherein said cross detecting means comprises:
a first calculating means for calculating a difference of detected outputs of alternate light receiving elements among said plurality of light receiving elements; and
a second calculating means for calculating a difference or detected outputs of alternate light receiving elements among said plurality of light receiving elements which have not been calculated by said first calculating means;
an output of said first calculating means and an output of said second calculating means being used to detect the fact that said light beam has crossed said first area.

4. A track detector circuit according to claim 3, wherein said cross detecting means comprises:
a first multiplying means for squaring an output of said first calculating means;
a second multiplying means for squaring an output of said second calculating means;
an adding means for adding up an output or said first multiplying means and an output of said second multiplying means; and
a comparing means for comparing an output or said adding means with a specified value;
a result of comparison provided by said comparing means being used to detect the fact that said light beam has crossed said first area.

5. A tracking servo leading circuit, comprising:
a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, and wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area;
a signal generating means for generating a specified signal; and
a signal selecting means that selects a tracking error signal, which is produced using the detected outputs of said plurality of light receiving means, in a region in which said cross detecting means detects the fact that said light beam has crossed said first area, and that selects a signal, which is generated by said signal generating means, outside the region in which said cross detecting means detects the fact that said light beam has crossed said first area, said light beam being led to a desired track according to a signal selected by said signal selecting means.

6. A tracking servo leading circuit, comprising:
a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area, wherein said first area consists of guide patterns or areas of different reflectances lined up along tracks at regular intervals, and wherein said plurality of light receiving means are a plurality of light receiving elements set in array at regular intervals along tracks;
a signal generating means for generating a specified signal; and
a signal selecting means that selects a tracking error signal, which is produced using the detected outputs of said plurality of light receiving means, in a region in which said cross detecting means detects the fact that said light beam has crossed said first area, and that selects a signal, which is generated by said signal generating means, outside the region in which said cross detecting means detects the fact that said light beam has crossed said first area, said light beam being led to a desired track according to a signal selected by said signal selecting means.

7. A tracking servo leading circuit, comprising:
a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area, wherein said first area consists of guide patterns or areas of different reflectances lined up along tracks at regular intervals, wherein said plurality of light receiving means are a plurality of light receiving elements set in array at regular intervals along tracks, and wherein said cross detecting means comprises:
a first calculating means for calculating a difference of detected outputs of alternate light receiving elements among said plurality of light receiving elements, and a second calculating means for calculating a difference of detected outputs of alternate light receiving elements among said plurality of light receiving elements which have not been calculated by said first calculating means, wherein an output of said first calculating means and an output of said second calculating means are used to detect the fact that said light beam has crossed said first area;

a signal generating means for generating a specified signal; and a signal selecting means that selects a tracking error signal, which is produced using the detected outputs of said plurality of light receiving means, in a region in which said cross detecting means detects the fact that said light beam has crossed said first area, and that selects a signal, which is generated by said signal generating means, outside the region in which said cross detecting means detects the fact that said light beam has crossed said first area, said light beam being led to a desired track according to a signal selected by said signal selecting means.

8. A tracking servo leading circuit, comprising:

a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area, wherein said first area consists of guide patterns or areas of different reflectances lined up along tracks at regular intervals, wherein said plurality of light receiving means are a plurality of light receiving elements set in array at regular intervals along tracks, wherein said cross detecting means comprises:

a first calculating means for calculating a difference of detected outputs of alternate light receiving elements among said plurality of light receiving elements, and a second calculating means for calculating a difference of detected outputs of alternate light receiving elements among said plurality of light receiving elements which have not been calculated by said first calculating means, wherein an output of said first calculating means and an output of said second calculating means are used to detect the fact that said light beam has crossed said first area, and wherein said cross detecting means comprises:

a first multiplying means for squaring an output of said first calculating means, a second multiplying means for squaring an output of said second calculating means, an adding means for adding up an output of said first multiplying means and an output of said second multiplying means, and a comparing means for comparing an output of said adding means with a specified value, wherein a result of comparison provided by said comparing means is used to detect the fact that said light beam has crossed said first area;

a signal generating means for generating a specified signal; and a signal selecting means that selects a tracking error signal, which is produced using the detected outputs of said plurality of light receiving means, in a region in which said cross detecting means detects the fact that said light beam has crossed said first area, and that selects a signal, which is generated by said signal generating means, outside the region in which said cross detecting means detects the fact that said light beam has crossed said first area, said light beam being led to a desired track according to a signal selected by said signal selecting means.

9. A tracking servo leading circuit according to any one of claims 5–8, wherein said signal generating means generates a signal of a positive polarity and a signal of a negative polarity, and said signal selecting means selects a signal, which is generated by said signal generating means and has the same polarity as said tracking error signal, outside a region in which said cross detecting means detects the fact that said light beam has crossed said first area.

10. An optical information recording/reproducing apparatus, comprising:

a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, and wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area;

a light beam irradiating means for irradiating a light beam to the entire width of at least one of said plurality of tracks on said information recording medium;

a light beam moving means for moving said light beam relatively along tracks;

a light receiving means that receives the light of the images of said first area and said second area formed with said light beam which is moved by said light beam moving means, and that is divided into a plurality of sections;

a signal producing means that uses outputs of said light receiving means to produce a focus error signal, a tracking error signal, and a clock signal;

a control means that performs focus control and tracking control according to said focus error signal and tracking error signal;

an information recording means that irradiates a recording beam in synchronization with said clock signal and that records information; and a track information reproducing means that reproduces information from the entire width of said track using said light beam.

11. An optical information recording/reproducing apparatus, comprising:

a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area, wherein said first area consists of guide patterns or areas of different reflectances lined up along tracks at regular intervals, and wherein said plurality of light receiving means are a plurality of light receiving elements set in array at regular intervals along tracks;

a light beam irradiating means for irradiating a light beam to the entire width of at least one of said plurality of tracks on said information recording medium;

a light beam moving means for moving said light beam relatively along tracks;

a light receiving means that receives the light of the images of said first area and said second area formed with said light beam which is moved by said light beam moving means, and that is divided into a plurality of sections;

a signal producing means that uses outputs of said light receiving means to produce a focus error signal, a tracking error signal, and a clock signal;

a control means that performs focus control and tracking control according to said focus error signal and tracking error signal;

an information recording means that irradiates a recording beam in synchronization with said clock signal and that records information; and a track information reproducing means that reproduces information from the entire width of said track using said light beam.

12. An optical information recording/reproducing apparatus, comprising:

a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area, wherein said first area consists of guide patterns or areas of different reflectances lined up along tracks at regular intervals, wherein said plurality of light receiving means are a plurality of light receiving elements set in array at regular intervals along tracks, and wherein said cross detecting means comprises:

a first calculating means for calculating a difference of detected outputs of alternate light receiving elements among said plurality of light receiving elements, and a second calculating means for calculating a difference of detected outputs of alternate light receiving elements among said plurality of light receiving elements which have not been calculated by said first calculating means, wherein an output of said first calculating means and an output of said second calculating means are used to detect the fact that said light beam has crossed said first area;

a light beam irradiating means for irradiating a light beam to the entire width of at least one of said plurality of tracks on said information recording medium;

a light beam moving means for moving said light beam relatively along tracks;

a light receiving means that receives the light of the images of said first area and said second area formed with said light beam which is moved by said light beam moving means, and that is divided into a plurality of sections;

a signal producing means that uses outputs of said light receiving means to produce a focus error signal, a tracking error signal, and a clock signal;

a control means that performs focus control and tracking control according to said focus error signal and tracking error signal;

an information recording means that irradiates a recording beam in synchronization with said clock signal and that records information; and a track information reproducing means that reproduces information from the entire width of said track using said light beam.

13. An optical information recording/reproducing apparatus, comprising:

a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area, wherein said first area consists of guide patterns or areas of different reflectances lined up along tracks at regular intervals, wherein said plurality of light receiving means are a plurality of light receiving elements set in array at regular intervals along tracks, wherein said cross detecting means comprises:
- a first calculating means for calculating a difference of detected outputs of alternate light receiving elements among said plurality of light receiving elements, and
- a second calculating means for calculating a difference of detected outputs of alternate light receiving elements among said plurality of light receiving elements which have not been calculated by said first calculating means, wherein an output of said first calculating means and an output of said second calculating means are used to detect the fact that said light beam has crossed said first area, and wherein said cross detecting means comprises:
- a first multiplying means for squaring an output of said first calculating means,
- a second multiplying means for squaring an output of said second calculating means,
- an adding means for adding up an output of said first multiplying means and an output of said second multiplying means, and
- a comparing means for comparing an output of said adding means with a specified value, wherein a result of comparison provided by said comparing means is used to detect the fact that said light beam has crossed said first area;

a light beam irradiating means for irradiating a light beam to the entire width of at least one of said plurality of tracks on said information recording medium;
a light beam moving means for moving said light beam relatively along tracks;
a light receiving means that receives the light of the images of said first area and said second area formed with said light beam which is moved by said light beam moving means, and that is divided into a plurality of sections;
a signal producing means that uses outputs of said light receiving means to produce a focus error signal, a tracking error signal, and a clock signal;
a control means that performs focus control and tracking control according to said focus error signal and tracking error signal;
an information recording means that irradiates a recording beam in synchronization with said clock signal and that records information; and
a track information reproducing means that reproduces information from the entire width of said track using said light beam.

14. An optical information recording/reproducing, comprising:
a tracking servo leading apparatus having:
a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, and wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area;
a signal generating means for generating a specified signal; and
a signal selecting means that selects a tracking error signal, which is produced using the detected outputs of said plurality of light receiving means, in a region in which said cross detecting means detects the fact that said light beam has crossed said first area, and that selects a signal, which is generated by said signal generating means, outside the region in which said cross detecting means detects the fact that said light beam has crossed said first area,
said light beam being led to a desired track according to a signal selected by said signal selecting means;
a light beam irradiating means for irradiating a light beam to the entire width of at least one of said plurality of tracks on said information recording medium;
a light beam moving means for moving said light beam relatively along tracks;
a light receiving means that receives the light of the images of said first area and said second area formed with said light beam which is moved by said light beam moving means;
a signal producing means that uses outputs of said light receiving means to produce a focus error signal, a tracking error signal, and a clock signal;
a control means that performs focus control and tracking control according to said focus error signal and said tracking error signal;
an information recording means that irradiates a recording beam in synchronization with said clock signal and that records information; and
a track information reproducing means that reproduces information from the entire width of said track using said light beam.

15. An optical information recording/reproducing apparatus, comprising:
a tracking servo leading apparatus having:
a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area, wherein said first area consists of guide patterns or areas of different reflectances lined up along tracks at regular intervals, and wherein said plurality of light receiving means are a plurality of light receiving elements set in array at regular intervals along tracks, a signal generating means for generating a specified signal, and a signal selecting means that selects a tracking error signal, which is produced using the detected outputs of said plurality of light receiving means, in a region in which said cross detecting means detects the fact that said light beam has crossed said first area, and that selects a signal, which is generated by said signal generating means, outside the region in which said cross detecting means detects the fact that said light beam has crossed said first area, said light beam being led to a desired track according to a signal selected by said signal selecting means;

a light beam irradiating means for irradiating a light beam to the entire width of at least one of said plurality of tracks on said information recording medium;

a light beam moving means for moving said light beam relatively along tracks;

a light receiving means that receives the light of the images of said first area and said second area formed with said light beam which is moved by said light beam moving means;

a signal producing means that uses outputs of said light receiving means to produce a focus error signal, a tracking error signal, and a clock signal;

a control means that performs focus control and tracking control according to said focus error signal and said tracking error signal;

an information recording means that irradiates a recording beam in synchronization with said clock signal and that records information; and a track information reproducing means that reproduces information from the entire width of said track using said light beam.

16. An optical information recording/reproducing apparatus, comprising:

a tracking servo leading apparatus having:

a track detector circuit, wherein said track detector circuit is designed for an information recording medium having a plurality of tracks each of which includes at least a first area formed by combining areas of different reflectances along tracks, and a second area formed by combining areas of different reflectances perpendicularly to tracks, wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area, wherein said first area consists of guide patterns or areas of different reflectances lined up along tracks at regular intervals, wherein said plurality of light receiving means are a plurality of light receiving elements set in array at regular intervals along tracks, and wherein said cross detecting means comprises:

a first calculating means for calculating a difference of detected outputs of alternate light receiving elements among said plurality of light receiving elements, and a second calculating means for calculating a difference of detected outputs of alternate light receiving elements among said plurality of light receiving elements which have not been calculated by said first calculating means, wherein an output of said first calculating means and an output of said second calculating means are used to detect the fact that said light beam has crossed said first area, a signal generating means for generating a specified signal, and a signal selecting means that selects a tracking error signal, which is produced using the detected outputs of said plurality of light receiving means, in a region in which said cross detecting means detects the fact that said light beam has crossed said first area, and that selects a signal, which is generated by said signal generating means, outside the region in which said cross detecting means detects the fact that said light beam has crossed said first area, said light beam being led to a desired track according to a signal selected by said signal selecting means;

a light beam irradiating means for irradiating a light beam to the entire width of at least one of said plurality of tracks on said information recording medium;

a light beam moving means for moving said light beam relatively along tracks;

a light receiving means that receives the light of the images of said first area and said second area formed with said light beam which is moved by said light beam moving means;

a signal producing means that uses outputs of said light receiving means to produce a focus error signal, a tracking error signal, and a clock signal;

a control means that performs focus control and tracking control according to said focus error signal and said tracking error signal;

an information recording means that irradiates a recording beam in synchronization with said clock signal and that records information; and a track information reproducing means that reproduces information from the entire width of said track using said light beam.

17. An optical information recording/reproducing apparatus, comprising:

a tracking servo leading apparatus having:

a track detector circuit, wherein said track detector is designed for an information recording medium having a plurality of tracks each of which includes at least a first area formed by combining areas of different reflectances along tracks, and a second area formed by combining areas of different reflectances perpendicularly to tracks, wherein said track detector circuit includes: (a) a light beam moving means for moving a light beam to be irradiated over said first area and said second area along tacks and perpendicularly to tracks, (b) a light receiving means for detecting the images of said first area and said second area formed with said light beam irradiated and that is divided into multiple sections along tracks, and (c) a cross detecting means, using the detected outputs of said plurality of light receiving means, for detecting the fact that said light beam has crossed the first area, and the fact that said light beam has reached a substantially central portion of the first area, wherein said first area consists of guide patterns or areas of different reflectances lined up along tracks at regular intervals, wherein said plurality of light receiving means are a plurality of light receiving elements set in array at regular intervals along tracks, wherein said cross detecting means comprises:

a first calculating means for calculating a difference of detected outputs of alternate light receiving elements among said plurality of light receiving elements, and a second calculating means for calculating a difference of detected outputs of alternate light receiving elements among said plurality of light receiving elements which have not been calculated by said first calculating means, wherein an output of said first calculating means and an output of said second calculating means are used to detect the fact that said light beam has crossed said first area, and wherein said cross detecting means comprises:

a first multiplying means for squaring an output of said first calculating means, a second multiplying means for squaring an output of said second calculating means, an adding means for adding up an output of said first multiplying means and an output of said second multiplying means, and a comparing means for comparing an output of said adding means with a specified value, wherein a result of comparison provided by said comparing means is used to detect the fact that said light beam has crossed said first area, a signal generating means for generating a specified signal, and a signal selecting means that selects a tracking error signal, which is produced using the detected outputs of said plurality of light receiving means, in a region in which said cross detecting means detects the fact that said light beam has crossed said first area, and that selects a signal, which is generated by said signal generating means, outside the region in which said cross detecting means detects the fact that said light beam has crossed said first area, said light beam being led to a desired track according to a signal selected by said signal selecting means;

a light beam irradiating means for irradiating a light beam to the entire width of at least one of said plurality of tracks on said information recording medium;

a light beam moving means for moving said light beam relatively along tracks;

a light receiving means that receives the light of the images of said first area and said second area formed with said light beam which is moved by said light beam moving means;

a signal producing means that uses outputs of said light receiving means to produce a focus error signal, a tracking error signal, and a clock signal;

a control means that performs focus control and tracking control according to said focus error signal and said tracking error signal;

an information recording means that irradiates a recording beam in synchronization with said clock signal and that records information; and a track information reproducing means that reproduces information from the entire width of said track using said light beam.

18. An optical information recording/reproducing apparatus, according to any one of claims 14–17, wherein said light beam moving means comprises:

a medium moving means for moving said information recording medium along tracks;

a first irradiation moving means for moving said light beam irradiating means along tracks; and a second irradiation moving means for moving said light beam irradiating means perpendicularly to tracks.

19. An optical information recording/reproducing apparatus according to any one of claims 14–17, further comprising a positioning means for positioning said recording beam emitted from said recording means perpendicularly to tracks on the basis of said clock signal.

20. An optical information recording/reproducing apparatus according to any one of claims 14–17, further comprising an information recording medium, wherein said information recording medium comprises:

a plurality of tracks each including at least a first area formed by combining a plurality of areas of different reflectances lined up alternately along tracks, and a second area formed by combining areas of different reflectances perpendicularly to tracks; and guide patterns lined up along tracks having a plurality of information lines;

an aspect ratio of each of said plurality of areas of different reflectances in said first area being 1:2N (N is an integer).

* * * * *